(12) United States Patent
McKeeman

(10) Patent No.: US 12,008,493 B2
(45) Date of Patent: Jun. 11, 2024

(54) SYSTEM AND METHODS FOR SELECTING EQUIPMENT AND OPERATORS NECESSARY TO PROVIDE AGRICULTURAL SERVICES

(71) Applicant: Trevor Tee McKeeman, Manhattan, KS (US)

(72) Inventor: Trevor Tee McKeeman, Manhattan, KS (US)

(73) Assignee: HITCHPIN, INC., Manhattan, KS (US)

( * ) Notice: Subject to any disclaimer, the term of this patent is extended or adjusted under 35 U.S.C. 154(b) by 0 days.

(21) Appl. No.: 16/569,957

(22) Filed: Sep. 13, 2019

(65) Prior Publication Data

US 2020/0090107 A1 Mar. 19, 2020

Related U.S. Application Data

(60) Provisional application No. 62/730,898, filed on Sep. 13, 2018.

(51) Int. Cl.
| | |
|---|---|
| *G06Q 10/0631* | (2023.01) |
| *G01W 1/10* | (2006.01) |
| *G06Q 10/0633* | (2023.01) |
| *G06Q 10/0639* | (2023.01) |
| *G06Q 50/02* | (2012.01) |

(52) U.S. Cl.
CPC . *G06Q 10/063112* (2013.01); *G06Q 10/0631* (2013.01); *G06Q 10/063116* (2013.01); *G06Q 10/06316* (2013.01); *G06Q 10/0633* (2013.01); *G06Q 10/06393* (2013.01); *G06Q 10/06398* (2013.01); *G01W 1/10* (2013.01); *G06Q 50/02* (2013.01)

(58) Field of Classification Search
CPC .......................... G06Q 10/04; G06Q 10/06315
See application file for complete search history.

(56) References Cited

U.S. PATENT DOCUMENTS

| | | | | |
|---|---|---|---|---|
| 5,237,497 | A * | 8/1993 | Sitarski | G06Q 10/06316 705/7.26 |
| 2002/0059320 | A1* | 5/2002 | Tamaru | E01C 19/00 |
| 2003/0074391 | A1* | 4/2003 | Carter | G06Q 30/0206 709/200 |
| 2005/0165881 | A1* | 7/2005 | Brooks | G06F 9/5027 709/200 |

(Continued)

OTHER PUBLICATIONS

Torgerson, Randall E, "Machinery 'Rings': Scotland's New Cooperative Frontier," Farmer Cooperatives, Jan. 1992.*

(Continued)

*Primary Examiner* — Renae Feacher
(74) *Attorney, Agent, or Firm* — MEDLER FERRO WOODHOUSE & MILLS PLLC

(57) ABSTRACT

Systems and methods are described for selecting equipment and operators necessary to provide agricultural services. Systems and methods are also described for scheduling the selected agricultural services and for rescheduling the scheduled agricultural services in response to events identified to be of potential impact to the services. The systems and methods are useful for increasing the utilization factor of equipment and equipment operators used in agriculture.

20 Claims, 13 Drawing Sheets

(56) References Cited

U.S. PATENT DOCUMENTS

| | | | |
|---|---|---|---|
| 2007/0043603 A1* | 2/2007 | Andersen | G06Q 10/063112 705/7.14 |
| 2008/0077479 A1* | 3/2008 | Carter | G06Q 10/04 705/7.31 |
| 2010/0299172 A1* | 11/2010 | Nottoli | G06F 3/0483 705/29 |
| 2011/0166701 A1* | 7/2011 | Thacher | A01D 34/008 700/245 |
| 2012/0130915 A1* | 5/2012 | Diaz | G06Q 10/1053 705/321 |
| 2013/0317872 A1* | 11/2013 | Nakamichi | G06Q 10/063114 705/7.15 |
| 2013/0339969 A1* | 12/2013 | Koski | G06Q 10/10 718/103 |
| 2014/0172360 A1* | 6/2014 | Folk | G01F 23/247 702/156 |
| 2015/0348419 A1* | 12/2015 | Matthews | A01B 79/02 701/117 |
| 2016/0110788 A1* | 4/2016 | Stephenson | G06Q 30/0613 705/7.29 |
| 2016/0379282 A1* | 12/2016 | Hill | G06Q 50/01 705/26.1 |
| 2017/0061382 A1* | 3/2017 | Zhang | G06Q 10/1053 |
| 2017/0169526 A1* | 6/2017 | Medrek | G06Q 50/188 |
| 2018/0101612 A1* | 4/2018 | Rosztoczy | G06F 3/14 |
| 2018/0108075 A1* | 4/2018 | Willett | G06Q 30/0635 |
| 2018/0137446 A1* | 5/2018 | Shike | G06Q 50/08 |
| 2018/0144413 A1* | 5/2018 | Rupp | H04W 4/70 |
| 2018/0168118 A1* | 6/2018 | Redmond | A01G 17/06 |
| 2018/0189745 A1* | 7/2018 | Fleming | G06Q 10/06316 |
| 2018/0189748 A1* | 7/2018 | Anderson | G06Q 10/06311 |
| 2018/0189861 A1* | 7/2018 | Golub | G06Q 30/0633 |
| 2018/0276741 A1* | 9/2018 | Groff | G06Q 10/06 |
| 2020/0202453 A1* | 6/2020 | Sworski | G07C 5/008 |

OTHER PUBLICATIONS

Kimme et al., "Managing Machinery and Equipment," PennState Extension, Updated 2016, <https://extension.psu.edu/ managing-machinery-and-equipment>.*

Torgerson, Randall, "Machinery 'Rings': Scotland's New Cooperative Frontier," Farmer Cooperation, 1982.*

"Machineery Rings Factsheet", FarmWeb, E&OE, Jun. 21, 2012.*

NPL (Year: 1992).*

* cited by examiner

SYSTEM AND METHODS FOR SELECTING EQUIPMENT AND OPERATORS NECESSARY TO PROVIDE AGRICULTURAL SERVICES

RELATED APPLICATIONS

This application claims the benefit of prior U.S. Provisional Patent Application Ser. No. 62/730,898, filed Sep. 13, 2018, which its hereby incorporated by reference in its entirety for all purposes.

TECHNICAL FIELD

The present invention generally relates to systems and methods for selecting equipment and operators necessary to provide agricultural services, and for scheduling and rescheduling those services. The systems and methods are useful for increasing the utilization factor of equipment and equipment operators used in agriculture.

BACKGROUND

Machinery and equipment are major cost items in farm businesses. Larger machines, new technology, higher prices for parts and higher energy prices have all caused machinery costs to rise in recent years. Machinery costs can be divided into two categories: annual ownership costs, which occur regardless of machine use, and operating costs, which vary directly with the amount of machine use. Ownership costs may include a capital recovery factor or depreciation, taxes, insurance, and housing facilities. Operating costs may include fuel, maintenance, lubrication, and labor (for example for service or operation). Implements or attachments may further add to the machinery and equipment cost. In spite of these high costs, the utilization factor of farming equipment is lower than ideal.

Within this disclosure, the following participants within the agricultural services industry are defined. "Producers" are individuals, collectives, cooperatives or commercial farming entities who own, utilize or manage land or livestock for the production of food materials. "Equipment owners" are individuals, collectives, cooperatives or commercial entities who own agricultural machinery or equipment. The agricultural machinery or equipment may also comprise any associated ancillaries such as implements or attachments. "Operators" are individuals, collectives, cooperatives or commercial entities who may operate agricultural machinery, equipment or ancillaries in order to perform an agricultural service, such as harvesting a crop, preparing land for a particular agricultural purpose, installing drainage or irrigation, feeding of livestock, maintaining the health or condition of livestock, sowing a crop, performing fertilization or pest control and so forth. In some examples, a producer, equipment owner or operator may be involved exclusively in their respective role or line of business. However, in general, individuals, collectives or commercial entities may assume multiple roles. For example, a producer may also own and provide-for-hire, machinery and equipment, and may also offer to operate such equipment on behalf of other producers. Within this disclosure, the term "service provider" may encompass both equipment owners (who hire out machinery or equipment for others to use) and/or operators (who hire out human resources to provide a service to others).

Currently, a producer who requires a particular service to be completed often finds that contracting for those services or renting equipment is more capital efficient and cost effective than owning the equipment themselves. There are some farming service providers such as custom harvesting crews, cooperatives, and individual producers that can be used to provide agricultural services to producers. However, it is often difficult for producers to secure services when demand is high. Currently, securing these services is a manual and inefficient process, involving word of mouth, reliance on previous relationships, and chance encounters. Even when a provider is identified and contracted, there are often no assurances as to when that provider will perform the service. The producer often doesn't know if they are first in line or fifth in line. This is particularly troublesome during critical windows of time during which services need to be completed, such as harvesting, where crop conditions and weather can change rapidly. Timely harvest can mean the difference between a profitable or non-profitable year. New equipment is also becoming increasingly sophisticated, leading to higher initial outlay costs. Many producers are then unable to justify the cost of the machine for the amount of work they have on their farm alone. However, as aforementioned, the alternative of identifying suitable machinery and equipment for hire at the right time, location, and cost point, and of finding trustworthy and available operators to use the machinery to perform an agricultural service, can be a time-consuming and laborious task. To compound this difficulty, a producer may have only limited visibility of the market such that the set of identified options for equipment and labor represent only a fraction of those that are actually available. Such obfuscations and limitations in choice can again lead to suboptimal utilization factors of available equipment and human resources and may also lead to the producer paying above market rates for a given service.

Farming is a low margin business and inefficiencies such as those described above can lead to farming business difficulties or even insolvency. Therefore, systems and methods are needed to increase the possible utilization factor of farm equipment and the resources needed to use it. The disclosure herein provides a technical solution to these problems and describes a system and methods for increasing utilization factors of farm equipment, land resources, and human resources.

BRIEF SUMMARY OF THE DISCLOSURE

The present disclosure describes systems and methods useful for improving the utilization factor of agricultural machinery and equipment, and the human resources needed to operate such. The systems and methods enable seekers of an agricultural service (such as producers) to rapidly identify both equipment owners and operators and to contract out their use for predetermined scheduled periods as a farming service package. The systems and methods are based upon an intelligent digital platform for connecting buyers and sellers of agricultural services and for pairing offerings from potentially different service providers to form an overall service package.

To facilitate the above, the systems and methods gather, track, store and analyze a plurality of different information types. The further analysis of this information may lead to many actionable uses, including real time scheduling of services, pairing service providers with one another to form service packages, pairing service providers and producers, finding the optimal service providers for a given producer in a search type format, providing real-time push notifications to available service providers when a producer need is identified, providing real-time push notifications to producers when there is service provider availability in their areas, and so on. Information tracking and analysis further enables re-planning of the delivery of services to producers in the case that an event (such as adverse weather conditions, transport delays, lack of relevant skilled labor) causes a delay in the delivery of a service. Intelligent real-time scheduling and planning based on information tracking and analysis mitigates the risk that a delayed job will lead to subsequent follow-on delays or cancellations for other jobs. The systems and methods of the present disclosure are operable to reduce search time for finding products and agricultural services, to increase the utilization of existing machine inventory and human resources, to reduce the need for producers to own their own machinery or hire their own crew, to enhance record keeping and data collection for analytics, to increase the speed and efficiency of job or service completion, and to facilitate scheduling, rescheduling, payment and delivery of the service.

A computer-implemented method is described for selecting equipment and operators necessary to provide agricultural services, the method comprising: receiving, by an information manager, one or more requirements related to an agricultural service from a device of a producer; receiving, by the information manager, one or more specifications related to one or more pieces of agricultural equipment; receiving, by the information manager, one or more characteristics related to one or more operators; analyzing, by the information manager, the one or more requirements, the one or more specifications, and the one or more characteristics, producing, by the information manager and according to the analyzing, one or more candidate pairings of an operator of the one or more operators and a piece of agricultural equipment of the one or more pieces of agricultural equipment, the one or more candidate pairings selected to meet the one or more requirements related to the agricultural service; sending, by the information manager, the one or more candidate pairings to the device of the producer, wherein the candidate pairings include the specifications of the agricultural equipment and the characteristics of the operator of each candidate pairing; receiving, by the information manager, a selected pairing of the one or more candidate pairings from the device of the producer; sending, by the information manager to a device of the operator identified in the selected pairing, one or more of the specifications of the piece of agricultural equipment identified in the selected pairing, and one or more of the requirements related to the agricultural service; and classifying, by the information manager, the operator and the agricultural equipment of the selected pairing as unavailable for the duration of the agricultural services.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that provide the technical solution of selecting equipment and operators necessary to provide agricultural services.

A. Computing and Network Environment

Figure 1A:
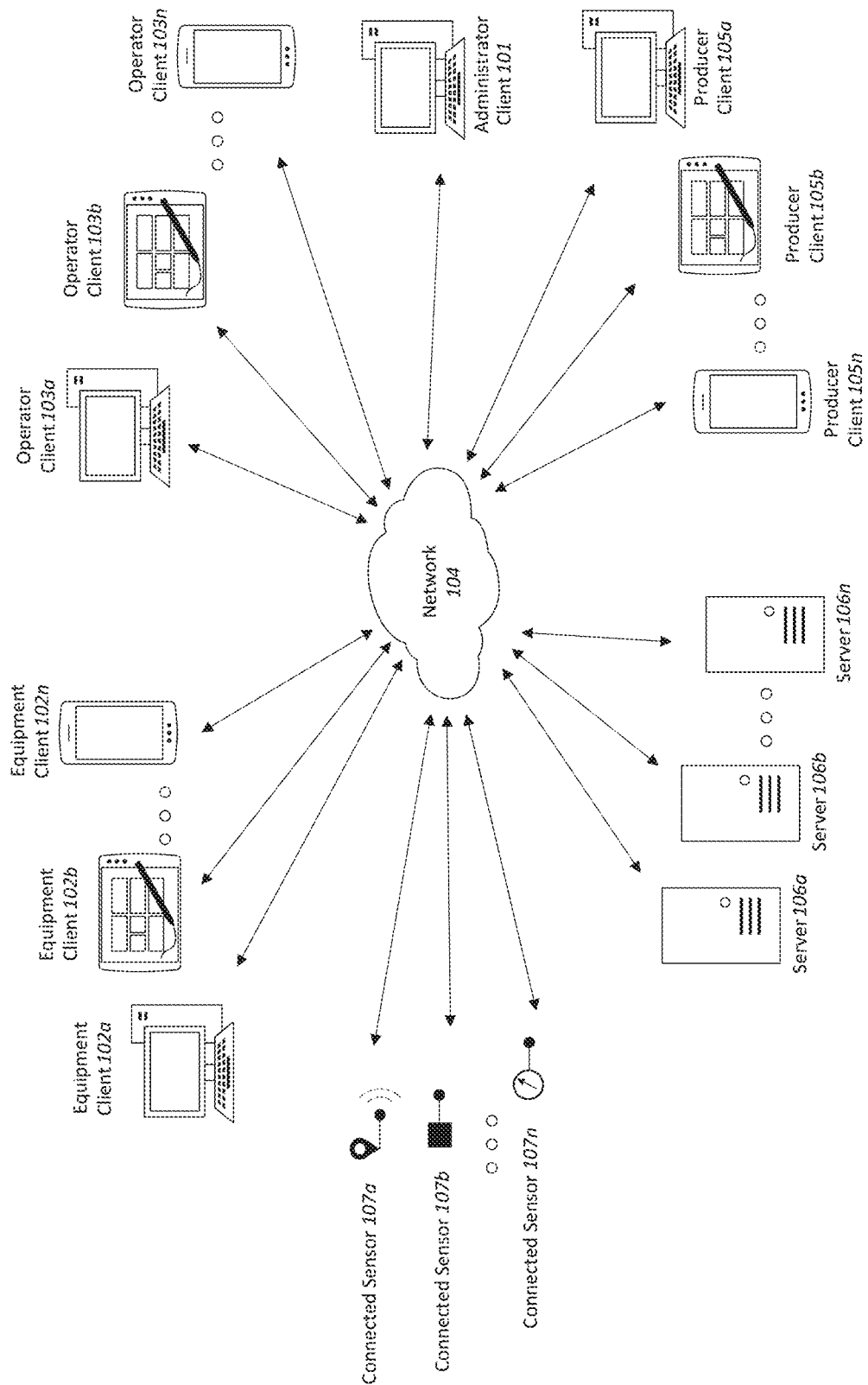
FIG. 1A is a block diagram depicting an embodiment of a network environment comprising an agricultural management system.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more equipment clients 102a-102n (also generally referred to as local equipment machines(s) 102, equipment client(s) 102, equipment client node(s) 102, equipment client machine(s) 102, equipment client computer(s) 102, equipment client device(s) 102, equipment endpoint(s) 102, or equipment endpoint node(s) 102) in communication with one or more operator client(s) 103a-103n (also generally referred to as local operator machines(s) 103, operator client(s) 103, operator client node(s) 103, operator client machine(s) 103, operator client computer(s) 103, operator client device(s) 103, operator endpoint(s) 103, or operator endpoint node(s) 103) and one or more producer clients 105a-105n (also generally referred to as local producer machines(s) 105, producer client(s) 105, producer client node(s) 105, producer client machine(s) 105, producer client computer(s) 105, producer client device(s) 105, producer endpoint(s) 105, or producer endpoint node(s) 105) and one or more administrator clients 101 (also generally referred to as local administrator machines(s) 101, administrator client(s) 101, administrator client node(s) 101, administrator client machine(s) 101, administrator client computer(s) 101, administrator client device(s) 101, administrator endpoint(s) 101, or administrator endpoint node(s) 101) and one or more connected sensors 107a-107n and one or more servers 106a-106n (also generally referred to as server(s) 106, node(s) 106, machine(s) 106, or remote machine(s) 106) via one or more networks 104. In some embodiments, an equipment client 102 has the capacity to function as both a client node seeking access to resources provided by a server and as a server providing access to hosted resources for other equipment clients 102a-102n. In some embodiments, an operator client 103 has the capacity to function as both a client node seeking access to resources provided by a server and as a server providing access to hosted resources for other operating clients 103a-103n. In some embodiments, a producer client 105 has the capacity to function as both a client node seeking access to resources provided by a server and as a server providing access to hosted resources for other producer clients 105a-105n.

Although FIG. 1A shows a network 104 between the equipment clients 102, the operator clients 103, the producer clients 105, the administrator clients 101, the connected sensors 107 and the servers 106, the equipment clients 102, the operator clients 103, the producer clients 105, the administrator clients 101, the connected sensors 107 and the servers 106 may be on the same network 104. In some embodiments, there are multiple networks 104 between the equipment clients 102, the operator clients 103, the producer clients 105, the administrator clients 101, the connected sensors 107 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN)

connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
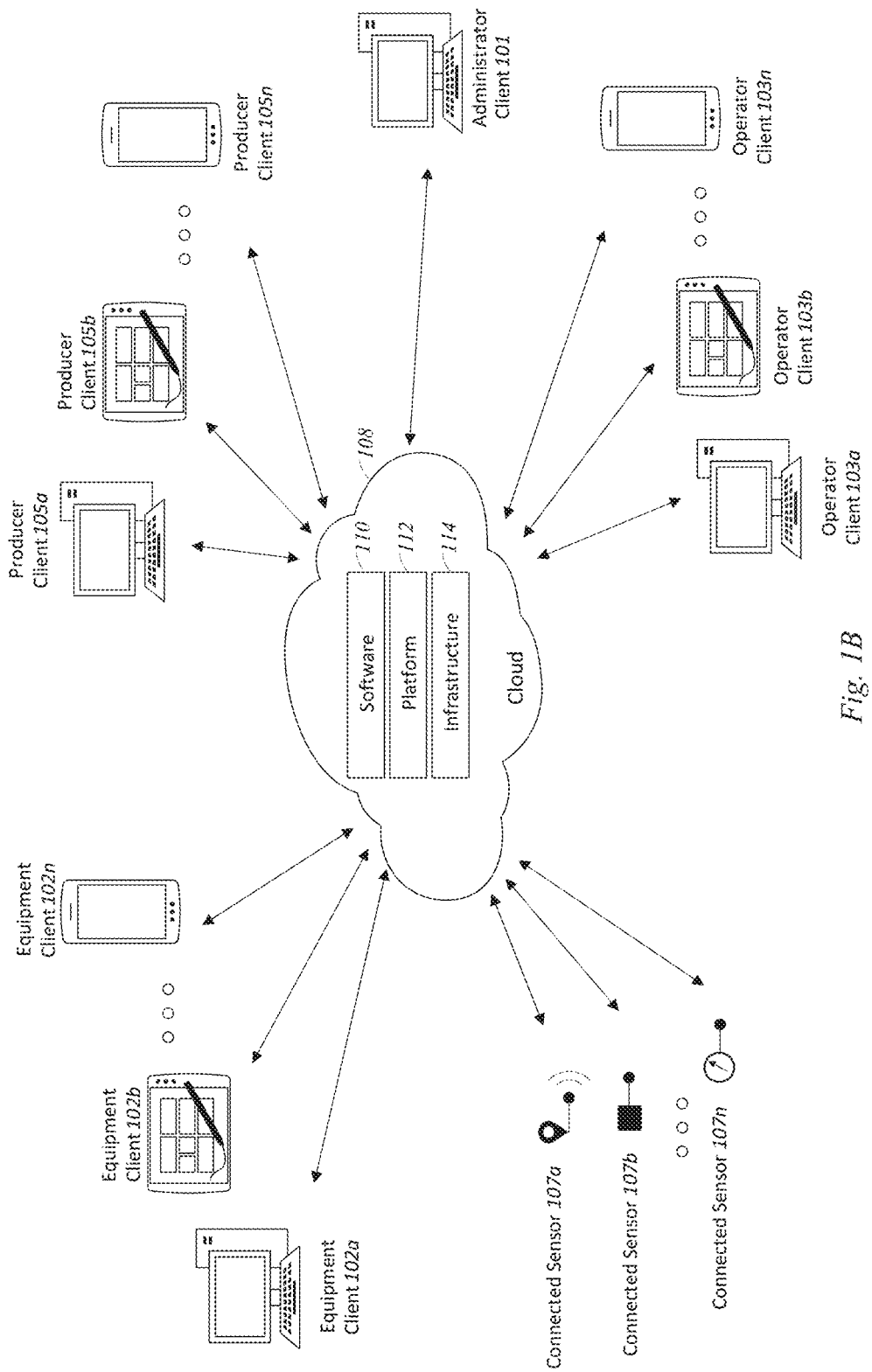
FIG. 1B is a block diagram depicting a cloud computing environment comprising communications with agricultural equipment owners, equipment operators, agricultural producers, administrators and connected sensors.

Referring to FIG. 1B, a cloud computing environment is depicted. A cloud computing environment may provide equipment client 102 and/or operator client 103 and/or producer client 105 and/or administrator client 101 and/or connected sensor 107 with one or more resources provided by a network environment. The cloud computing environment may include one or more equipment clients 102a-102n and one or more operator clients 103a-103n and one or more producer clients 105a-105n and one or more administrator clients 101 and one or more connected sensors 107a-107n, in communication with the cloud 108 over one or more networks 104. Equipment clients 102, operator clients 103, producer clients 105 and administrator clients 107 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the equipment client device 102 and/or the operator client device 103 and/or the producer client devices 105 and/or the administrator client devices 101. The cloud 108 may include back end platforms, e.g., servers 106, storage, server farms or data centers.

The cloud 108 may be public, private, or hybrid. Public clouds may include public servers 106 that are maintained by third parties to the equipment clients 102 and/or operator clients 103 and/or producer clients 105 and/or administrator clients 101, or the owners of the equipment clients 102 and/or operator clients 103 and/or producer clients 105 and/or administrator clients 101. The servers 106 may be located off-site in remote geographical locations as disclosed above or otherwise. Public clouds may be connected to the servers 106 over a public network. Private clouds may include private servers 106 that are physically maintained by equipment clients 102 and/or operator clients 103 and/or producer clients and/or administrator clients 101, or owners of equipment clients 102 and/or operator clients 103 and/or producer clients 105 and/or administrator clients 101. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Equipment clients 102 and/or operator clients 103 and/or producer clients 105 and/or administrator clients 101 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102, 103, 105, 101 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Equipment clients 102 and/or operator clients 103 and/or producer clients 105 and/or administrator clients 101 may access SaaS resources through the use of web-based user interfaces, provided by a web browser (e.g. Google Chrome, Microsoft Internet Explorer, or Mozilla Firefox provided by Mozilla Foundation of Mountain View, California). Equipment clients 102 and/or operator clients 103 and/or producer clients 105 and/or administrator clients 101 may also access SaaS resources through smartphone or tablet applications, including e.g., Salesforce Sales Cloud, or Google Drive App. Equipment clients 102 and/or operator clients 103 and/or producer clients 105 and/or administrator clients 101 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The equipment clients 102 and/or operator clients 103 and/or producer clients 105 and/or administrator clients 101 and/or connected sensors 107 and/or server 106 may be deployed as and/or executed on any type and form of computing device, e.g., a computer, network device or appliance capable of communicating on any type and form of network and performing the operations described herein.

Figure 1C:
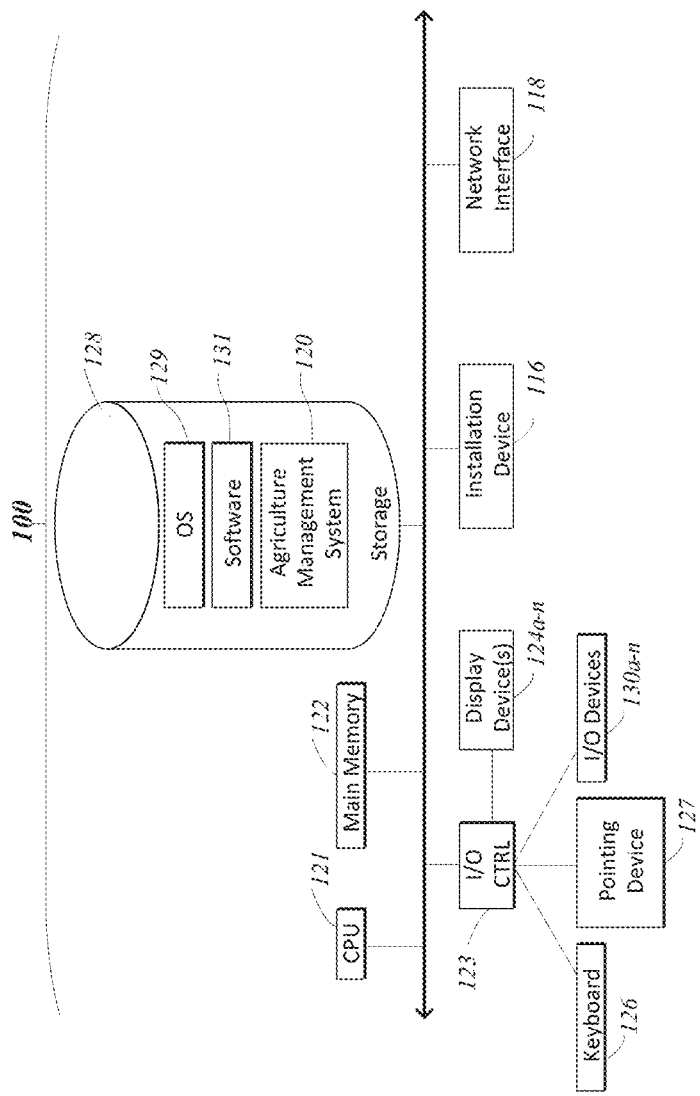
FIG. 1C and FIG. 1D are block diagrams depicting embodiments of computing devices useful in connection with the methods and systems described herein.
Figure 1D:
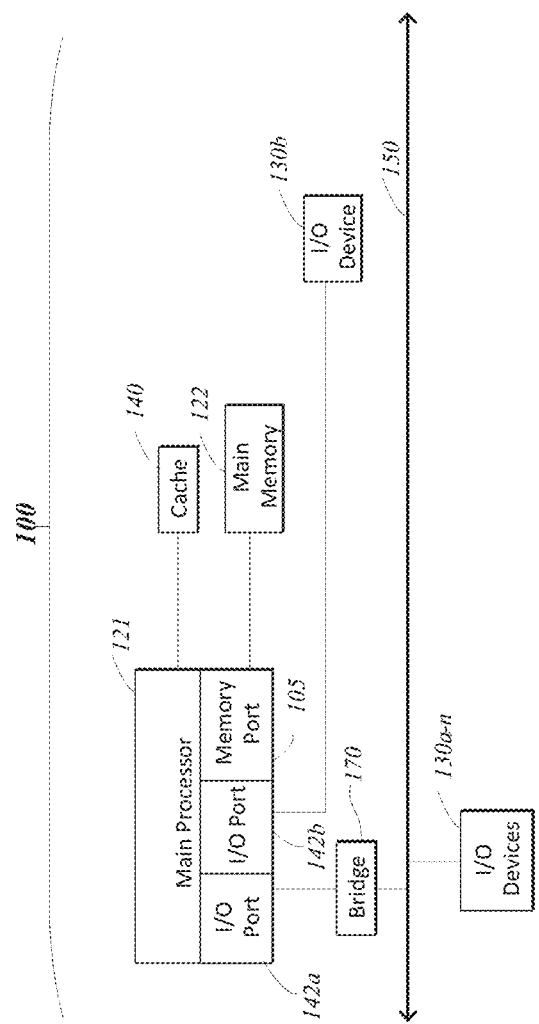

FIGS. 1C and 1D depict block diagrams of a computing device 100 useful for practicing an embodiment of the equipment client 102 and/or operator client 103 and/or producer client 105 and/or administrator client 101 and/or connected sensor 107 and/or server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 105, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 105. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero equipment clients 102 and/or operator clients 103 and/or producer clients 105 and/or administrator clients 101 and/or connected sensors 107. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on an equipment client 102 and/or operator client 103 and/or producer client 105 and/or administrator client 101 and/or connected sensor 107. An application distribution platform may include a repository of applications on a server 106 or a cloud 108, which the equipment clients 102a-102n and/or operator clients 103a-103n and/or producer clients 105a-105n and/or administrator clients 101 and/or connected sensors 107a-107n may access over a network 104. An application distribution platform may include application developed and provided by various developers. A user of an equipment client 102 and/or operator client 103 and/or a producer client 105 and/or an administrator client 101 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, byAmazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York.

In some embodiments, the equipment client 102 and/or operator client 103 and/or producer client 105 and/or administrator client 101 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the equipment client device 102 and/or operator client device 103 and/or producer client device 105 is a laptop or desktop computer equipped with a web browser and a microphone and speaker system, e.g. a telephony headset. In these embodiments, the equipment client devices 102a-102n and/or operator client devices 103a-103n and/or producer client devices 105a-105n are web-enabled and can receive and initiate phone calls. In some embodiments, a laptop or desktop computer is also equipped with a webcam or other video capture device that enables video chat and video call.

In some embodiments, the status of one or more machines 101, 102, 103, 105, 106 and/or 107 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Selecting Equipment and Operators Necessary to Provide Agricultural Services The following describes systems and methods for selecting equipment and operators necessary to provide agricultural services and which are useful for increasing the utilization factor of equipment and equipment operators used in agriculture.

As discussed above, a technical problem exists in the coordination of agricultural services that results in the under-utilization of farm equipment, farmland, and farm equipment operators. This technical problem results from a lack of technical means for coordination between these various entities. An agricultural management system according to the present disclosure addresses this technical problem through the provision of a technical solution including various device, system, hardware, firmware, and software features that, when employed in coordination as discussed herein, address the technical coordination and optimization problems.

An agricultural management system according to the present disclosure can be configured to serve as a sharing, search, and transaction platform for agricultural equipment, operators of agricultural equipment and producers in need of agricultural services. An agricultural management system according to the present disclosure may be configured to optimize scheduling and facilitate asset tracking with a goal of maximizing the utilization of agricultural equipment and the agricultural equipment operators, while enabling producers to meet their needs in a timely manner with reliability and predictability.

Producers (for example but not limited to, those that cultivate farmland to produce crops, or those that raise animals on farmland for consumption) often contract agricultural services to perform the various tasks needed by the producer. The demand for agricultural services varies greatly, depending on factors such as the seasons, weather patterns, the type of agricultural product for a particular producer (e.g., type of crop, type of livestock), and so forth. Producers may not own or have access to sufficient agricultural resources (for example, but not limited to, agricultural equipment, agricultural equipment operators, or agricultural equipment repair technicians), needed to service all of their needs, and the producers may be reliant on agricultural service providers. Agricultural service providers may provide agricultural equipment to the producer, and/or may provide agricultural equipment operators to the producer, and/or may provide repair services for agricultural equipment to the producer. It should be understood that there may be other services that the agricultural producer needs that may be provided by agricultural service providers, and this disclosure is not limited to the examples given, which are given by way of illustration only.

The utilization of agricultural equipment is much lower than ideal. Lack of visibility of the availability, location, and state of readiness of agricultural equipment, and operators qualified to operate it, contribute to the suboptimal utilization. There can be delays to the actual provision of services due to factors that are beyond the control of the producer, for example weather conditions, equipment transport delays, or lack of qualified agricultural equipment operators, since everything has to be simultaneously ready to deploy for the services to take place.

Figure 2A:
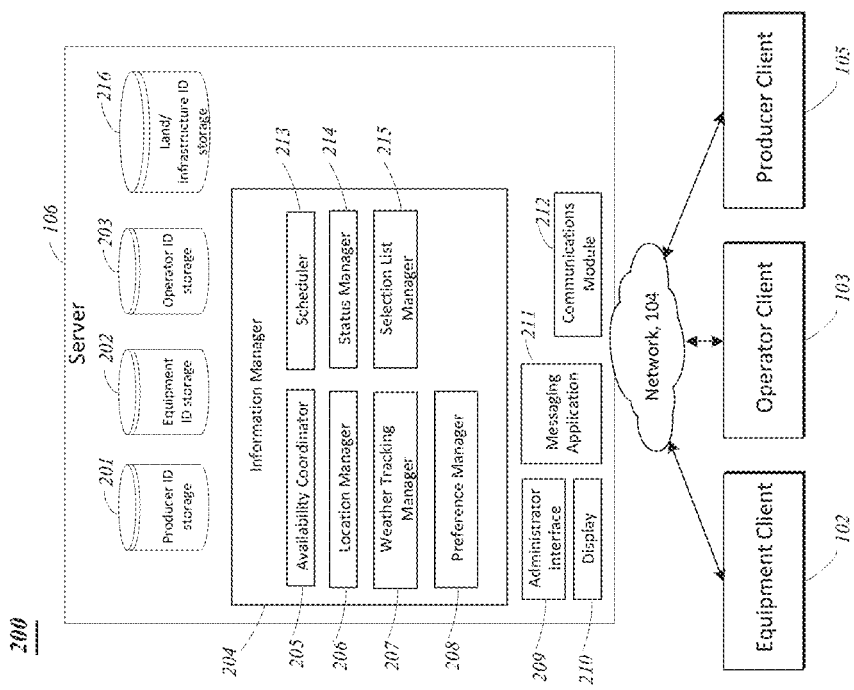
FIG. 2A depicts one example embodiment of some of the architecture of an agricultural management system useful for increasing the utilization factor of equipment and equipment operators used in agriculture.

FIG. 2A depicts one example embodiment of some of the architecture of an agricultural management system useful for increasing the utilization factor of equipment and equipment operators used in agriculture. FIG. 2A of the present disclosure is the same as FIG. 2A of U.S. provisional application 62/730,898 filed Sep. 13, 2018, the entirety of which is incorporated herein by reference, and within which, a full description of an embodiment according to FIG. 2A is provided.

In the embodiment of FIG. 2A, a server 106 comprises producer ID storage 201, equipment ID storage 202, operator ID storage 203 and land/infrastructure storage 216. Producer ID storage 201 may contain records of all the producers that are known by agricultural management system 200, and each may contain several pieces of information about a producer. Equipment ID storage 202 may contain records of all the equipment owners that are known by agricultural management system 200, and each may contain several pieces of information about an equipment owner and/or information regarding agricultural equipment they own which may be offered for hire. Operator ID storage 203 may contain records of all the operators that are known by agricultural management system 200, and each may contain several pieces of information about an operator and/or information regarding the services or capabilities they are able to offer.

The embodiment of FIG. 2A further comprises an information manager 204 which may communicate with the aforementioned storages 201, 202, 203 and 216 and which may manage various aspects of scheduling agricultural services via its incorporation of a number of sub-functions including availability coordinator 205, location manager 206, weather tracking manager 207, preference manager 208, scheduler 213, status manager 214, and selection list manager 215. The following provides an abbreviated description of each of these sub-functions in this particular embodiment of system 200 and information manager 204.

Availability coordinator 205 may be configured to generate or modify a collection of potential pairings of equipment and operators that could provide a requested service for a producer, considering for example the requirements of the requested service together with the capabilities, and restrictions of equipment and operators or any other information storages 201, 202, 203 and 216. As an example, availability coordinator 205 may generate a list of potential pairings of operators and equipment that may fulfil a producer request to cut and bale hay from a producer's piece of land. The availability coordinator 205 may search for the equipment required to cut and bale the hay, which shows availability on and around the requested date of service. The availability coordinator 205 may additionally search for operators capable of operating the equipment to cut and bale the hay, which have availability on and around the requested date of service.

Location manager 206 may be configured to assist in identifying potential pairings of equipment and operators that could provide a requested service for a producer, by providing information relating to for example the location at which the service is to be performed and the locations of any operators and equipment that may be needed. As an example, location manager 206 may generate a list of potential pairings of operators and equipment that may fulfil a producer request to cut and bale hay from a producer's piece of land. Location manager 206 may search for equipment required to cut and bale the hay which is located near to the location of the required service (or which an equipment owner is able or willing to move to the location of the service). The location manager 206 may additionally search for operators capable of operating the equipment to cut and bale the hay, which are near to (or are able or willing to travel to) the location of the required service.

Weather tracking manager 207 may be configured to collect meteorological information that could potentially impact the ability for a pairing of equipment and equipment operators to provide a requested service for a producer. In doing so, weather tracking manager 207 may take into account historical meteorological information (for example to determine a probability of rain at a given time of the year) and/or short-term or long-term forecasts.

Weather tracking manager 207 may also take into account the sensitivity of a specific service to weather conditions. For example, a service of cutting and bailing hay may be very sensitive to rain in the forecast and the scheduling of the service would be subject to the weather at the time of the service. Conversely, a service of fence repair may be compatible with rainy weather, and weather conditions need not constrain the scheduling of the service.

Preferences manager 208 may be configured to collect and analyze preference information that could potentially impact the suitability of a pairing of equipment and equipment operators to provide a requested service for a producer. In doing so, preference manager 208 may determine the suitability of an equipment/operator pairing by taking into account, for example, stored preferences of equipment and operators, or other information held in storages 201, 202, 203 or 216. For example, a producer may indicate a preference for a specific operator to provide services of a particular nature or type, or a producer may indicate a preference for equipment of a specified reliability, a specified make or model or with a maximum number of operating hours. In further examples, a producer may indicate a preference for equipment located within a specified distance of the site of the service, and/or equipment that the producer does not need to arrange transportation for.

Scheduler 213 may be configured to receive, for example, from a producer client 105, a selection for a pairing of equipment and equipment operators to provide a requested service for the producer. Scheduler 213 may subsequently coordinate communications and messaging to one or more equipment owners or operators in the pairing and may indicate a corresponding reservation, lack of availability or tentative availability of the equipment or operators to availability coordinator 205.

Status manager 214 may be configured to update a global calendar or timetable of scheduled services that is maintained by the agricultural management system 200, or may update calendars associated with a particular producer, equipment owner or operator.

Selection list manager 215 may be configured to order or rank a list of potential pairings of equipment and operators according to producer requirements or preferences. Such a ranking or ordering may be performed for example prior to sending the potential pairings to the producer client 105. Selection list manager may also be configured to update a list of pairings of equipment and operators responsive to receiving a selection of one or more pairings from a producer client, or responsive to receiving an indication of a change of availability of the equipment or operators of a pairing.

Server 106 in the embodiment of FIG. 2A also includes an administrator interface 209 for receiving system configuration information from an administrator, a display 210 to facilitate the input of configuration information by an administrator or for displaying information determined by the system during the course of its operation, a messaging application 211 for generating and receiving messages that are communicated between the server and client devices 102, 103 and 105, and a communications module 212 for facilitating the transportation of communications to or from the server 106, optionally via one or more networks 104.

In the embodiment of FIG. 2A, each of the server 106, information manager 204, availability coordinator 205, location manager 206, weather tracking manager 207, preference manager 208, scheduler 213, status manager 214, selection list manager 215, administrator interface 209, messaging application 211, and communications module 212 may comprise a program, service, task, script, library, application or any type and form of executable instructions or code executable on one or more processors. Furthermore, any of the server 106, information manager 204, availability coordinator 205, location manager 206, weather tracking manager 207, preference manager 208, scheduler 213, status manager 214, selection list manager 215, administrator interface 209, messaging application 211, and communications module 212 may be combined into one or more modules, applications, programs, services, tasks, scripts, libraries, applications, or executable code.

Figure 2B:
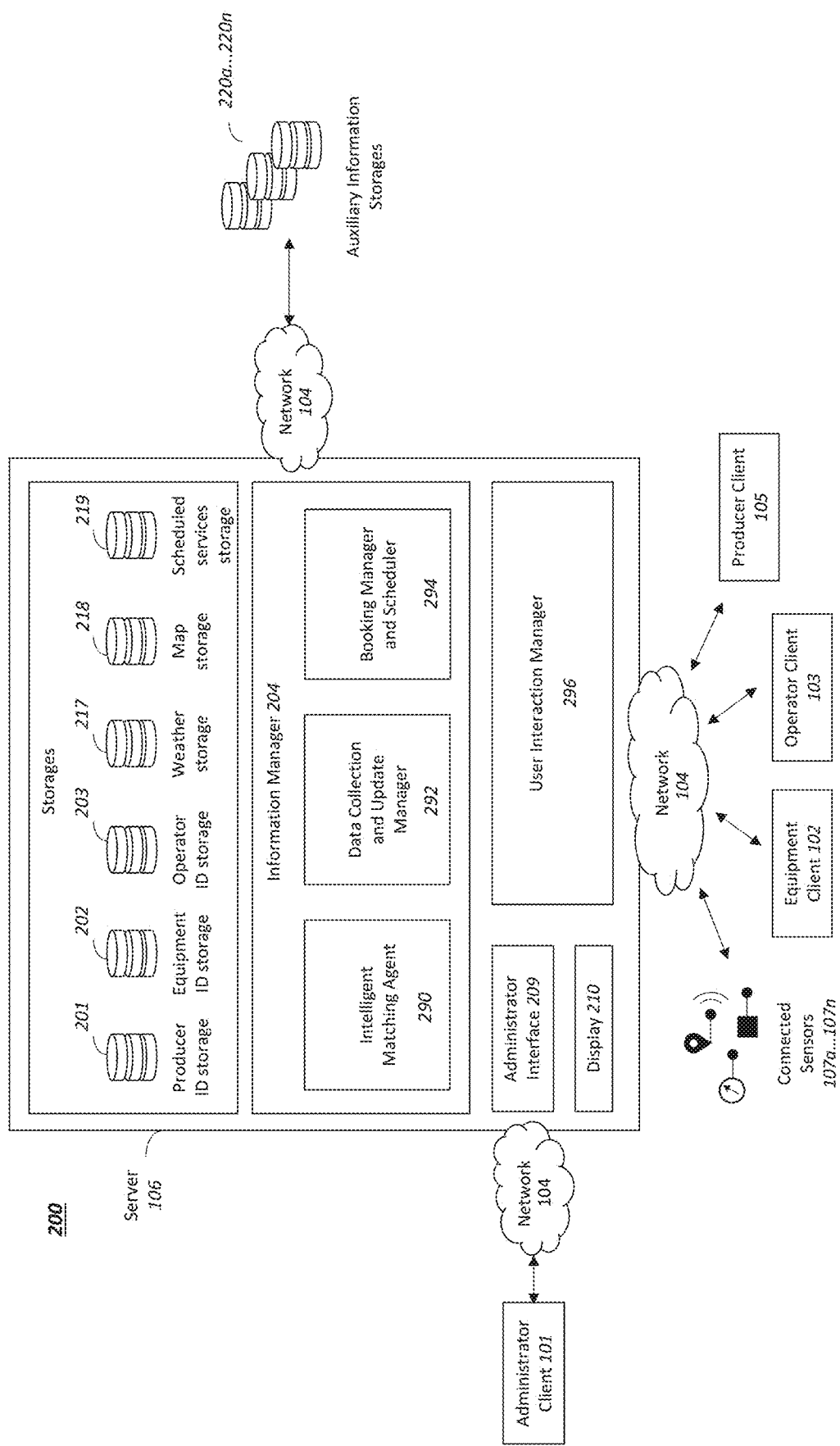
FIG. 2B depicts a further example embodiment of some of the architecture of an agricultural management system useful for increasing the utilization factor of equipment and equipment operators used in agriculture.

FIG. 2B depicts an alternative example embodiment of some of the architecture of an agricultural management system 200 configured to increase the utilization factor of equipment and equipment operators used in agriculture. In some implementations the system 200 includes a server 106, an administrator client 101, an equipment client 102, an operator client 103, a producer client 105, connected sensors 107a-107n, auxiliary information storages 220a-220n and one more networks 104 allowing communication between these system components. The server 106 may include multiple storage components (also referred to as "storages") configured to store structured or unstructured data and information. In some embodiments, server 106 includes a producer ID storage 201, an equipment ID storage 202, an operator ID storage 203, a weather storage 217, a map storage 218 and a scheduled services storage 219. Server 106 may include an information manager 204, configured to manage data and information from one or more storages or received by one or more other components of agricultural management system 200. In examples, information manager 204 may include intelligent matching agent 290, data collection and update manager 292 and booking manager and scheduler 294 as well as other components not shown.

Server 106 may additionally include administrator interface 209, display 210, and user interaction manager 296.

Referring again to FIG. 2B in more detail, server 106 may include producer ID storage 201. Producer ID storage 201 may contain one or more records related to each of the producers known by agricultural management system 200. A record associated with a producer may be referred to as a "producer record". In some embodiments, a producer record is created in producer ID storage 201 when a producer registers or becomes a member of the agricultural management system 200. In embodiments, a record for a producer in producer ID storage 201 may contain several pieces of "general" information about the producer, for example the record may include a producer name or handle, a producer ID, a producer password, contact information for the producer, and other information about a producer to allow the producer to securely access agricultural management system 200. Such a record may be referred to as a "general producer information record," this being one example record type within a producer record. In some examples, a general producer information record in producer ID storage 201 may further contain information about the producer's agricultural business, for example the type of agricultural business (e.g., crops, livestock, etc.), the location of the producer, the size of the producer enterprise (e.g., land size, number of heads of livestock, etc.), preferences of the producer, (i.e., related to how they prefer to have agricultural services delivered, operators they prefer to work with, etc.).

In some examples, a producer record in producer ID storage 201 may also include a "land/infrastructure record" comprising information on land or infrastructure that is also associated with a producer. In examples, land/infrastructure records may contain information regarding all the fields and crop infrastructure that are known by agricultural management system 200 to be owned, operated or otherwise associated with a particular producer. In some embodiments, such a record may be created within producer ID storage 201 when a producer wishes to register a plot of land that can be used for agriculture, for example a crop field or a pasture for livestock. In embodiments, a producer may become a member of the agricultural management system 200 by creating a record associated with land or infrastructure within producer ID storage 201.

In some examples, a producer record within producer ID storage 201 may comprise one or more land/infrastructure records, each comprising information regarding a respective piece of land (such as a field or pasture) or a respective item or unit of infrastructure such as a grain bin, silo, hay barn, animal housing, building, storage facility and so forth that are associated with or owned by that producer. In examples, a land/infrastructure record in producer ID storage 201 may comprise information about the land for example the type of land, the size of the land, the geolocation coordinates of the land, the topology of the land, the use of the land, the condition of the land, the date/type/supplier of the last service of the land, etc. In further examples, a land/infrastructure record within producer ID storage 201 may comprise information about an item or unit of infrastructure such as its type, size, purpose, use and location. Such information may also comprise a status of the unit of infrastructure such as a total capacity of a storage facility, its current fill level or available capacity, or may comprise additional details such as how to access the unit of infrastructure (e.g. lock combination, key code, etc.), what types of product a unit of storage infrastructure can be used for, etc.

In examples, a land/infrastructure record in producer ID storage 201 may additionally contain a reliability rating for the piece of land or infrastructure, configured to represent how reliable the land or infrastructure has historically been in performing its role. For example, for land, a land/infrastructure record in producer ID storage 201 may contain details about past year's crop yields, blights or pest problems, drought or irrigation issues, etc. For storage such as grain bins or silos, a land/infrastructure record in producer ID storage 201 may contain details of past history of leakage, water penetration, security issues, contamination, mold, or other issues. Land/infrastructure record in producer ID storage 201 may additionally include the location of the storage, and an indication of whether the storage is fixed or transportable. Land/infrastructure record in producer ID storage 201 may contain a schedule of the availability of the land and/or storage, which may, for example, be in the form of a calendar. The availability of the land and/or storage may reflect times when the land and/or storage is scheduled for a crop and when the land is available for pasture. The availability of storage may include times when the storage is scheduled for maintenance or service, transport, or other activities which would mean the storage is not available for scheduling. Land/infrastructure records in producer ID storage 201 may include preferences associated with the land and/or for each storage, for example the type of crop or crops that the land and/or storage can be used for, the maximum or minimum allowable length of time of a scheduled booking, a whitelist or blacklist of producers or other entities that are permitted to utilize the land and/or storage, a minimum rating of producers or other entities that are permitted to utilize the land and/or the storage, and so forth. Such preferences that are associated with a specific area of land or a unit of infrastructure may be separate and distinct from more general (or "global") preferences to a producer (for example, within the general producer information record) that are also held within producer ID storage 201.

In further examples, a producer record within producer ID storage 201 may comprise one or more "service requirement records", for example, for each agricultural service that the producer currently has a need for. For example, a producer record for a producer with mixed arable and livestock farming interests might comprise both a first service requirement record indicating a need for crop harvesting and a second service requirement indicating a need for a particular preventative animal health treatment. In examples, a service requirement record within a producer record may comprise requirements defining the service that is needed, and/or preferences that are specific to that service (as distinct from preferences that may be global to the producer, such as within the general producer information record). In examples, requirements within the service requirements record may include (but are not limited to) a service type or category, a type of agricultural land or a type of livestock, a location at which the service is to be performed, scheduling constraints or time windows during which the service is (or is not) to be performed, equipment needed to perform the service, capabilities or minimum specifications of the needed equipment, equipment transportation preferences, minimum required operator experience or qualification levels, operator insurance requirements, weather requirements for undertaking the work, whether accommodation for personnel may be provided, a price that the producer is willing to pay for the service, payment preferences and so forth.

In examples, the information used to populate a services requirement record may be input by a producer via a producer client device 105 and communicated to server 106 for subsequent storage within producer ID storage 201. In some examples, and with reference to FIG. 3C, such information may optionally first be stored within required services storage 282 prior to its upload to the server 106.

In general, any information stored within producer ID storage 201 may originate from the producer themselves (for example via data entry into an application running on a producer client device 105), from an administrator (for example via data entry into an application running on an administrator client device 101), from a connected sensor 107, or from an auxiliary storage 220a-220n. As illustrative examples, producer ID storage 201 may include a location of the producer client device 105 that is measured and reported by a location sensor, or a grain storage status may be measured and reported by a volumetric or weight sensor located within the grain storage bin. In other examples, an ownership of land (and therefore its association to a given producer) may be determined using land transaction information stored in one or more auxiliary storages 220a-220n.

Table 1 provides one example, in the form of a structured list, of information content that may be held within a producer record within producer ID storage 201. It shall be appreciated this example serves for illustrative purposes only and does not limit the scope of producer-related records and information content that may additionally or alternatively be stored. The example also does not prescribe any particular ordering or structuring of the data. To the contrary, information may be stored or represented within producer ID storage 201 in any suitable manner.

TABLE 1

Example Producer Record in Producer ID Storage

Producer record:
General producer information record:

Producer ID
Producer name or handle
Security information
Password
Device identifier(s)
Fallback security questions
. . .
Contact information
Postal address
Email address
Telephone number(s)
. . .
Location of business or property
Location of producer device
Line of Business
Produce #1
Type of produce
Scale of produce
. . .
Produce #2
Type of produce
Scale of produce
. . .
Product or service interests
. . .
Preferences
Minimum service provider rating
Maximum cost (per service or per item of equipment)
Maximum distance to service provider
Preferred service providers
Service provider whitelist
Service provider blacklist
. . .
Producer feedback score, reliability information or reputational rating
. . .
Land/infrastructure record #1

Type: Land or Infrastructure
Sub-type: (e.g. field, storage building, animal housing)
Location information TABLE 1-continued Example Producer Record in Producer ID Storage Usage information
Purpose
Capacity
Current status
Availability
Current
Scheduled
Reliability information or rating
Preferences
Permitted users
Minimum allowable user rating
Maximum booking period
. . .
. . .
Land/infrastructure record #2

Type: Land or Infrastructure
Sub-type: (e.g. field, storage building, animal housing)
Location information
. . .
Land/infrastructure record #3

. . .
Service requirement record #1

Service type or category
Type of land or livestock
Location at which the service is to be performed
Scheduling constraints
Equipment needs
Product types
Product capabilities or minimum specifications
Duration of hire
Equipment transportation preferences
Minimum reliability rating
Operator needs
Minimum experience or qualification levels
Duration of hire
Insurance requirements
Accommodation offered
Weather requirements
Pricing limits
Payment preferences
. . .
Service requirement record #2

Service type or category
Type of land or livestock
Location at which the service is to be performed
. . .

Server 106 may include equipment ID storage 202. Equipment ID storage 202 may contain records of all the agricultural equipment known by agricultural management system 200.

In some embodiments, a record is created in equipment ID storage 202 when an equipment owner becomes a member of the agricultural management system 200 by registering a piece of equipment. In some embodiments, each equipment owner has a record in equipment ID storage 202 with associated records (or sub-records) for all of the pieces of equipment controlled by that equipment owner. In other embodiments, each piece of equipment may have its own record within equipment ID storage 202 and may (for example by means of a sub-field within the record) be associated with a particular equipment owner.

In embodiments, an "equipment owner record" for an equipment owner in equipment ID storage 202 may contain several pieces of general or "global" information about the equipment owner (referred to as a "general equipment owner record") in addition to one or more records specific to a piece or other unit of equipment (referred to as "equipment records").

In examples, a general equipment owner information record may include an equipment owner name or handle, an equipment owner ID, an equipment owner password, contact information for the equipment owner, and other information about an equipment owner to allow the equipment owner to securely access agricultural management system 200. The general equipment owner information record may further include additional information relating to the equipment owner such as a location of the equipment owner's business, the location of the equipment owner's client device 102, categories or types of machinery or equipment that the equipment owner provides for hire and the scale of the equipment owner's business. In yet further examples, the general equipment owner information record may include preferences of the equipment owner such as a minimum acceptable rating of a hirer, operator or customer, a maximum supply radius or delivery distance, a list of preferred customers, producers or operators, a customer or operator whitelist or blacklist, or may include a feedback score, reliability rating or reputational score of the equipment owner. In examples, the feedback score, reliability rating or reputational score may be based on feedback from other users of the system that have previously used the services of the equipment owner.

In further examples, an equipment record (e.g. within an equipment owner record in equipment ID storage 202) may contain information about each piece of equipment, for example the type of equipment, the size of the equipment, the date of manufacture of equipment, the date of last service of the equipment, and the number of operating hours of the equipment. An equipment record in equipment ID storage 202 may additionally contain a reliability rating for the piece of equipment, configured to represent how reliable the equipment has historically been in completing its job or intended function. For example, a high reliability rating may be assigned to equipment that did not break down or require service during the job. Equipment record in equipment ID storage 202 may additionally include the location of the equipment, and an indication of whether the equipment owner is able to transport the equipment to a producer site, or whether the producer needs to transport the equipment to the producer site. In further examples, an equipment record in equipment ID storage 202 may contain a schedule of the availability of the equipment, which may, for example, be in the form of a calendar. The availability of the equipment may reflect times when the equipment is scheduled for a job with a producer and may include times when the equipment is scheduled for maintenance or service, transport, or other activities which would mean the equipment is not available for scheduling for a job with a producer.

In examples, an equipment record (e.g. within an equipment owner record in equipment ID storage 202) is specific to a piece or other unit of equipment and may include preferences of the equipment owner that are also specific to that equipment. For example, an equipment record may comprise a type of crop or crops that the piece of equipment can be used for, the maximum distance the equipment may be transported, the maximum or minimum length of time of a scheduled booking for the piece of equipment, a whitelist or blacklist of operators that are permitted to operate the equipment, a minimum rating of operators that are permitted to operate the equipment, and so forth.

Table 2 provides one example, in the form of a structured list, of information content that may be held within an equipment owner record within equipment ID storage 202. It shall be appreciated this example serves for illustrative purposes only and does not limit the scope of equipment- or equipment-owner related records and information content that may additionally or alternatively be stored. The example also does not prescribe any particular ordering or structuring of the data. To the contrary, information may be stored or represented within equipment ID storage 202 in any suitable manner.

TABLE 2

Example Equipment Record in Equipment ID Storage

Equipment owner record:
General equipment owner information record:

Equipment owner ID
Equipment owner name or handle
Security information
Password
Device identifier(s)
Fallback security questions
. . .
Contact information
Postal address
Email address
Telephone number(s)
. . .
Location of business or equipment storage property
Location of equipment owner's device
Business
Equipment categories or types
Scale of business
. . .
Preferences
Minimum acceptable rating of hirer, operator or customer
Maximum supply radius or delivery distance
Preferred customers or producers
Customer, producer or operator whitelist
Customer, producer or operator blacklist
. . .
Equipment owner feedback score, reliability information
or reputational rating
. . .

Equipment record #1

Type
Purpose
Product
Manufacturer
Model number
Specification(s)
Performance or capacity
Prior usage history
Maintenance requirements
Maintenance records
Present condition
Date of manufacture
Reliability information/reliability rating
Current location
Transportation/delivery options
Maximum delivery distance
Availability
Current
Scheduled
Preferences
Permitted users, operator whitelists or blacklists
Minimum allowable user rating
Maximum or minimum booking period
. . .
Qualifications or experience required to operate
. . .

Equipment record #2

Type
Purpose

TABLE 2-continued

Example Equipment Record in Equipment ID Storage

Product
Manufacturer
. . .
Equipment record #3

. . .

Server 106 may include operator ID storage 203. Operator ID storage 203 may contain records of all the operators that are known by agricultural management system 200. In some embodiments, a record is created in operator ID storage 203 when an operator becomes a member of the agricultural management system 200 by registering with the system. In embodiments, an "operator record" for an operator in operator ID storage 203 may contain several pieces of general or "global" information about the operator (referred to as a "general operator information record") in addition to one or more records specific to particular capabilities of the operator (referred to as one or more "operator capability records").

In examples, a general operator information record stored within operator ID storage 203 may include an operator name or handle, an operator ID, an operator password, contact information for the operator, and other information about an operator to allow the operator to securely access agricultural management system 200. In examples, the general operator information record may further include additional information relating to the operator such as a home location or a location of the operator's place of business, a current location of the operator's client device 103, types of services that the operator is capable of performing, or categories or types of machinery or equipment that the operator is capable of operating. In yet further examples, the general operator information record may include preferences of the operator such as a minimum acceptable rating of a hirer (e.g. producer), equipment owner or customer, a maximum distance the operator is willing to travel to provide services, a preferred list or preference ranking of customers, producers or equipment owners that the operator will provide services to, a whitelist or blacklist of customers, producers or equipment owners, preferred working (or non-working) days or times of the year, a minimum booking notice period, and so forth. The general operator information record may further include a feedback score, reliability rating or reputational score of the operator which in examples, may be based on feedback from other users of the system that have previously used the services of the operator. In some examples, the general operator information record in operator ID storage 203 may include a current availability of the operator, or a scheduled/future availability, for example in the form of a booking calendar.

In some examples, an operator record in operator ID storage 203 may contain information about the operator's capabilities, for example the type of agricultural equipment that the operator is qualified to operate. In some embodiments, such information may be stored within the general operator information record. In other embodiments, operator capability information may be stored within one or more "operator capability records" within an operator record in operator ID storage 203. Such an architecture thereby allows an operator to register a potential plurality of different capabilities and to provide information that is specific to each within a respective operator capability record.

In some examples, capability information within an operator record stored in operator ID storage 203 (e.g. within a general operator information record or within an operator capability record) may include links to qualification certificates that the operator has obtained which indicates that they are legally qualified to operate a type of equipment. In further examples, the capability information in an operator record may include the number of hours of operational experience the operator has on each given type of equipment that they are qualified to operate. In embodiments, an operator record may further include details of insurance that the operator carries. Such insurance may be applicable to the operator in general or applicable to the operator when operating a specific type of equipment, when performing a specific service or offered capability.

Table 3 provides one example, in the form of a structured list, of information content that may be held within an operator record within operator ID storage 203. It shall be appreciated this example serves for illustrative purposes only and does not limit the scope of equipment- or equipment-owner related records and information content that may additionally or alternatively be stored. The example also does not prescribe any particular ordering or structuring of the data. To the contrary, information may be stored or represented within operator ID storage 203 in any suitable manner.

TABLE 3

Example Equipment Record in Operator ID Storage

Operator Record:
General operator information record:

Operator ID
Operator name or handle
Security information
Password
Device identifier(s)
Fallback security questions
. . .
Contact information
Postal address
Email address
Telephone number(s)
. . .
Company or individual
Location of place of business
Location of operator device
Types of services offered
Categories or types of equipment that may be operated
Availability
Current
Scheduled
Preferences
Minimum acceptable rating of hirer, equipment supplier or customer
Maximum travel radius or distance
Preferred customers, equipment suppliers or producers
Customer, producer or equipment owner whitelist
Customer, producer or equipment owner blacklist
Preferred working days or times
Minimum booking notice period
. . .
Operator feedback score, reliability information or reputational rating
. . .
Operator capability #1

Agricultural service type
Equipment categories or types
Qualifications/certificates
Experience level
Insurance details
Preferences specific to capability #1
. . .
. . .

TABLE 3-continued

Example Equipment Record in Operator ID Storage

Operator capability #2

Agricultural service type
Equipment categories or types
Qualifications/certificates
...
Operator capability #3

...

While some agricultural services are relatively insensitive to the weather conditions that prevail at the time the service is performed, many other agricultural services may be severely impacted or heavily contingent upon the weather. In some embodiments therefore, agricultural management system 200 may utilize information regarding current, previous or forecast weather conditions for a number of different purposes during its operation, and such information may be stored within a weather storage 217. For example, system 200 may use forecast weather information stored within weather storage 217 to assist with the scheduling of an agricultural service or to notify a user of the system of a potential impact to an upcoming agricultural service that has been previously scheduled but which may now be at risk of disruption due to the weather. In other examples, historical weather-related information stored within weather storage 217 may be processed by system 200 in order to determine the best times of year on which to schedule weather-sensitive services in a particular geographical region. Weather storage 217 may be written-to or accessed-by any other function, functional entity, software component, application, storage or module within or external-to server 106.

In some embodiments, agricultural management system 200 may utilize geographical location information for a variety of different purposes during its operation. For example, system 200 may utilize the location of a producer client device 105, an equipment-owner client device 102 or an operator client device 103 (for example as may be stored within producer ID storage 201, equipment ID storage 202 and operator ID storage 203 respectively) in order to determine providers and purchasers of agricultural services that are proximally located. In other examples, system 200 may monitor and track the location of agricultural machinery or equipment in order to determine a road journey distance of the equipment to a place of potential use, such as the location of a producer's farm or land. In further examples, system 200 may reference the home or business addresses of operators, producers or clients in order to assess distances and journey options therebetween. In embodiments therefore, system 200 may include storage such as map storage 218 to hold geospatial reference information that may include for example topological information regarding terrain, terrain type, terrain elevation, the locations of places of interest such as towns, villages, cities, agricultural or business properties, as well as any road networks or other transportation links that interconnect them. Map storage 218 may be written-to or accessed-by any other function, functional entity, software component, application, storage or module within or external-to server 106.

In some embodiments, agricultural management system 200 may include scheduled services storage 219 and which may be configured to store information regarding agricultural services that have been scheduled and booked within the system. In some examples, scheduled services storage may comprise one or more scheduled service records, each for example associated with a given service that has been booked by a user of system such as a producer. In some examples a scheduled service record may include a number of sub-fields comprising the information, such as (but not limited to) a producer identifier to whom the service is to be delivered, identifiers for one or more equipment owners scheduled to provide agricultural equipment for the service, identifiers for one or more operators scheduled to provide human resources to operate the service or to operate equipment for the service, one or more pieces of agricultural equipment that are to be used in providing the service, calendar times or days during which the service is to be performed or during which the equipment is to be hired, a date and time at which the booking was made, a booking identifier, pricing or payment information associated with the scheduled service, any conditions that must be met in order to trigger payment or a release of any escrowed funds, and so forth. In some embodiments scheduled services storage 219 may be accessed or written to by a booking manager and scheduler 294, for example as may be comprised within an information manager 204 of server 106. However, it shall be appreciated that more generally, scheduled services storage 219 may be written-to or accessed-by any other function, functional entity, software component, application, storage or module within or external-to server 106.

In some embodiments, agricultural management system 200 may be configured to access and retrieve a diversity of different information and information types from sources that may lie either internal-to or external-to server 106. Such information sources may include (but are not limited to) any of storages 201, 202, 203, 217, 218 and 219, administrator client 101, equipment client 102, operator client 103, producer client 105, connected sensors 107 and auxiliary information storages 220a-220n. Auxiliary information storages 220a-220n may include any information useful for the operation of agricultural management system 200. As illustrative examples, auxiliary information storages 220a-220n may include (but not limited to) geographical map data, road and traffic data, land ownership data, land usage data, weather data, agricultural equipment information (such as manufacturers, product or model numbers, equipment capabilities, performance and specifications), insurance information, financial or banking information, personal identity verification information, calendar information (such as the dates of working days, weekends and statutory holidays), agricultural information (such as times of year or climatic conditions suitable for the harvesting of different crop types), information on livestock (such as species or breed information, suitable feed, welfare guidance or requirements and veterinary treatments and schedules), and so forth.

In examples, any storage used or accessed by agricultural management system 200 may be privately or publicly owned or may be local or remote to server 106. Further, any storage may comprise information that is freely or publicly accessible or has restricted access, for example only to users of a specific entity, or group. Yet further still, any storage may comprise information that is available with or without a financial cost or subscription.

Any storage may be written-to or accessed-by the server 106 via direct communication with the storage, via one or more private networks (such as an enterprise network) or via one or more public networks (such as the public internet).

It shall be appreciated that in embodiments of agricultural system 200, any of storages 201, 202, 203, 217, 218, 219 or 220, or any other storage component of system 200 may store not only information that is current or contemporary, but also information that is historical or archived. The storage of contemporary information allows system 200 to provide timely and up-to-date information to its users, while the storage of historical or archived information allows system 200 to access and analyze prior data records in order to determine underlying statistics of the stored data, probabilities of events and emerging trends. For example, by archiving service requirements listed by producers (stored within producer ID storage 201), system 200 may in some embodiment be configured to be capable of building a picture of which services are most commonly required in a given geographical region, at which times and so forth, and to factor this into scheduling decisions or pricing. In other examples, by archiving weather data (stored within weather storage 217), system 200 is able to determine the most statistically-likely times at which a given agricultural service is least likely to be adversely affected by the weather at a particular geographical location.

With continued reference to FIG. 2B, some embodiments of agricultural management system 200 include an information manager 204 responsible for managing various aspects of the system including collecting and updating data used by the system, intelligently pairing or "matching" equipment owners with operators in order to provide agricultural service offerings to producers and for coordinating the booking, scheduling or rescheduling of these services.

In examples, information manager 204 may communicate with or process input information from any other function, functional entity, software component, application, storage or module within server 106, such as (but not limited to) storages 201, 202, 203, 217, 218 or 219, user interaction manager 296, administrator interface 209 and display 210.

Information manager 204 may further communicate with or process information from any function, functional entity, software component, application, storage or module external to server 106 such as (but not limited to) administrator client 101, equipment client 102, operator client 103, producer client 105, connected sensors 107 or auxiliary information storages 220. Information manager 204 may therefore collect a diversity of information from a diversity of sources, coordinate the storage of such information within server storages, process the collected information to improve the ability of users of the system to buy, sell and schedule agricultural services, and coordinate communications with users of the system for example via user interaction manager 296.

In some embodiments, the information manager 204 may be integrated with or coupled to memory 122. In some embodiments, the memory may include any type and form of storage, such as a database or file system. The memory 122 may store data such as parameters and scripts as a result of the operation of information manager 204.

In some embodiments, information manager 204 of FIG. 2B may comprise one or more sub-functions as shown in FIG. 2A such as availability coordinator 205, location manager 206, weather tracking manager 207, preference manager 208, scheduler 213, status manager 214 and selection list manager 215. The capabilities and operation of these sub-functions 205, 206, 207, 208, 213, 214 and 215 may be found in the accompanying description of FIG. 2A of the present disclosure, and also in the description of FIG. 2A of U.S. provisional application 62/730,898 filed Sep. 13, 2018, the entirety of which is incorporated herein by reference.

In an alternative embodiment, such as illustrated in FIG. 2B of the present disclosure, information manager 204 may comprise an alternative set of sub-functions such as intelligent matching agent 290, data collection and update manager 292 and booking manager and scheduler 294. In some examples, such an alternative embodiment of information manager 204 may be configured to perform similar functionality (or to accomplish the same overall objectives) as the information manager 204 depicted in FIG. 2A. In other examples, the information manager 204 of FIG. 2B may be configured to offer additional or alternative functionality. Further details regarding the operation of information manager 204 in the context of FIG. 2B, and of its sub-functions 290, 292 and 294, may be found in the description of FIG. 2C.

In some embodiments, agricultural management system 200 may include a user interaction manager 296. In some examples, user interaction manager 296 may be configured to coordinate communications between any component or software function of server 106 and any component of client devices such as equipment clients 102, operator clients 103 and producer clients 105. In examples, such communications may comprise (but are not limited to) software protocol messages that govern the operation of any part of the server 106, software protocol messages that govern the operation of any part of the clients 102, 103 and 105, information requesting or conveying one or more pieces of user configuration 266 such as user requirements, preferences, security information, contact information, and so forth. More generally, such user configuration information 266 may comprise a request or data pertaining to any piece of information used to populate producer records in producer ID storage 201 (see Table 1), to populate equipment owner records in equipment ID storage 202 (see Table 2), or to populate operator records in operator ID storage 203 (see Table 3). In further examples, communications coordinated by user interaction manager 296 may comprise messages from server 106 to one or more clients 102, 103 or 105, or from one or more clients 102, 103 or 105 to server 106. In examples, such messages may be used to provide notifications to users (such as a notification that adverse weather may impact an upcoming service), to request user input (such as to confirm a time window for providing or receiving a service), to convey information determined by server 106 during the course of its operation to a user of the system (such as candidate pairings of equipment owners and operators that meet a producer's service requirements, a booking confirmation number, or a payment confirmation), or to convey information determined by a client 102, 103 or 105 during the course of its operation to server 106 (such as a location of the client device or a selected pairing of an equipment owner and an operator from a list of candidate pairings).

Messages communicated between user interaction manager 296 and clients 102, 103 and 105, may be of any appropriate format. For example, they may be email messages, text or SMS messages, messages used by particular messaging applications such as, e.g. WhatsApp™ (Facebook, Menlo Park, California), or any other type of message. Message types to be used in a particular message may be selected by e.g. a server 106 using an information manager 204. The messages may be generated in any appropriate manner, e.g. by running an instance of an application that generates the desired message type, such as running e.g. a Gmail™ application (Google, Mountain View, California), Microsoft Outlook™ (Microsoft, Redmond, Washington), a text messaging application, or any other appropriate application. The messages may be generated by running a messaging application on e.g. a virtual machine or may simply be run on an operating system of the server 106 or may be run in any other appropriate environment. The messages may be generated to be formatted consistent with specific messaging platforms, for example Outlook 365 (Microsoft, Redmond, Washington), Outlook Web Access (OWA) (Microsoft, Redmond, Washington), Webmail, iOS (Apple, Cupertino, California), Gmail client (Google, Mountain View, California), and so on.

In some embodiments, user interaction manager 296 may generate multiple instances of a message, which may be delivered to more than one participant or user in the agriculture management system 200. For example, user interaction manager 296 may generate and send a message to a producer, and an equipment owner, and an operator, indicating that the operator will pair with the equipment to provide a service to the producer.

In some embodiments, user interaction manager 296 may comprise software components that facilitate the display-of, update-of, control-of and communication-with a graphical user interface (GUI) that may be displayed on client devices 102, 103 and 105, wherein the GUI is usable by users of the system (such as equipment owners, operators and producers) to input informational content that may be subsequently received, stored and used by system 200 for its operations. Such informational content obtained or received by user interaction manager 296 may, for example, be stored within any of storages 201, 202, 203, 217, 219 or 220, or may be processed and used by information manager 204.

In some embodiments, user interaction manager 296 may support communications with a non-graphical user interface on client devices 102, 103 and 105, such as a user interface that accepts text or vocal input without displaying an interactive image. A graphical user interface may be displayed on a client device via a screen of a mobile phone, a monitor connected to a desktop or laptop computer or may be displayed on any other display. The user may interact with the graphical or non-graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, California), Microsoft Internet Explorer (Microsoft, Redmond, Washington), or Mozilla Firefox (Mozilla Foundation of Mountain View, California), or may be an application installed on a user's client device capable of opening a network connection to server 106 or may be any other type of interface.

In some embodiments, user interaction manager 296 may encompass one or more sub-functions, for example, a messaging application (such as messaging application 211 of the embodiment of FIG. 2A) for generating, receiving and processing messages, and a communications module (such as communications module 212 of the embodiment of FIG. 2A) for enabling the bidirectional transportation of such messages across a physical communications medium such as a wired or an air interface.

Messaging application 211, and communications module 212 may comprise a program, service, task, script, library, application or any type and form of executable instructions or code executable on one or more processors. Additional description of messaging application 211 and communications module 212 may be found in descriptive text accompanying FIG. 2A of the present disclosure, and in descriptive text accompanying FIG. 2A of U.S. provisional application 62/730,898 filed Sep. 13, 2018, the entirety of which is incorporated herein by reference.

Figure 2C:
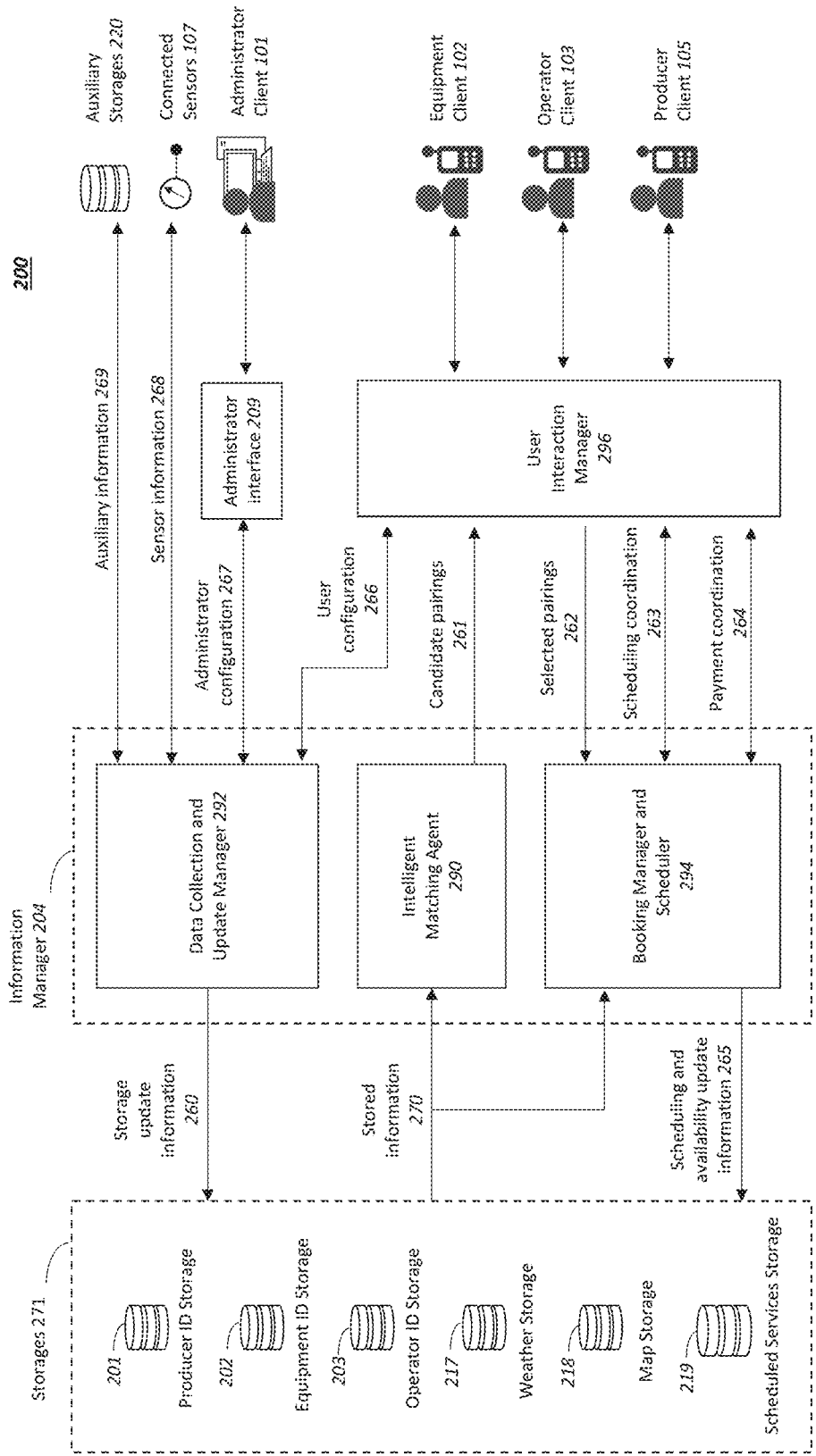
FIG. 2C depicts an example configuration of an agricultural management system, and interactions between components thereof.

Further details regarding the operation of user interaction manager 296 may be found in the description accompanying FIG. 2C of the present disclosure.

Server 106 may include administrator interface 209, to allow a system administrator to be able to configure and manage agricultural management system 200. Administrator interface 209 may include an input method such as a keyboard, mouse, touch screen interface, pointer, haptic interface, voice recognition interface, etc. by which an administrator may communicate information, queries, commands, requests, and other communications to agriculture management system 200.

In some embodiments, administrator interface 209 may be configured to coordinate communications with a local or remote administrator client 101, in order that the administrator may exert control over- and interact with the server 106 via the client device 101. In such an embodiment, administrator interface 209 may communicate with the administrator client 101 via a wired or wireless interface, either directly or via one or more networks 104.

In some implementations, administrator interface 209 may allow, for example via application programming interfaces (APIs), an administrator client 101 to access and/or change settings of an account maintained with any party involved with the agricultural management system 200, such as, for example, a producer, an equipment owner, or an equipment operator, or may allow an administrator (for example via an administrator client 101, via display 210, or via an input device such as a touchscreen, keyboard, mouse or any other input connected to administrator interface 209) to access and/or change any settings of an account maintained with a third party account provider, such as one that e.g. manages member accounts of an agricultural system platform, and/or to provide any other functions that would be appropriate for facilitating communications between the server 106 and any other participants in the agriculture management system 200.

In some examples, system 200 may include display 210 such that a system administrator may be presented with a graphical user interface or other visual interface for configuring and/or managing the system, and a visual display for viewing reports, metrics, and other system outcome.

In some embodiments, agricultural management system 200 may include one or more equipment clients 102, one or more operator clients 103 and one or more producer clients 105. Further detail and description of these clients may be found with reference to FIG. 3A, FIG. 3B and FIG. 3C respectively.

In some embodiments, agricultural management system 200 may include one or more connected sensors 107a . . . 107n. Examples and further detail and description of such connected sensors 107 may be found with reference to FIG. 3D and FIG. 3E.

In the embodiment of FIG. 2B, each of the server 106, information manager 204, intelligent matching agent 290, data collection and update manager 292, booking manager and scheduler 294, user interaction manager 296, and administrator interface 209 may comprise a program, service, task, script, library, application or any type and form of executable instructions or code executable on one or more processors. Furthermore, any of the server 106, information manager 204, intelligent matching agent 290, data collection and update manager 292, booking manager and scheduler 294, user interaction manager 296, and administrator interface 209 may be combined into one or more modules, applications, programs, services, tasks, scripts, libraries, applications, or executable code.

FIG. 2C depicts an example configuration of an agricultural management system, and interactions between components thereof.

In FIG. 2C, an arrangement of the components of the embodiment of FIG. 2B is shown together with various information and information types that may be exchanged between them. Such an arrangement of the components and communications and interactions between the components of the agricultural management system 200 serve as illustrative examples only, and do not in any way limit the scope of the present disclosure or preclude alternative arrangements and configurations of said components or alternative interconnectivity and communications therebetween.

In the embodiment of agricultural management system 200 shown in FIG. 2C, an information manager 204, such as may be comprised within a server 106, includes an intelligent matching agent 290, data collection and update manager 292 and booking manager and scheduler 294. In examples, information manager 204 (or any components thereof) may be connected to any of storages 201, 202, 203, 217, 218, 219 and 220, to administrator interface 209, to user interaction manager 296 or to connected sensors 107.

User interaction manager 296 may communicate with any of clients 102, 103 and 105, and administrator interface 209 may communicate with administrator client 101. While not explicitly shown for purposes of diagrammatical clarity, any components of information manager 204 (including intelligent matching agent 290, data collection and update manager 292 and booking manager and scheduler 294 may also communicate with one another in order to exchange information directly rather than via one or more of the illustrated storages 271.

In the embodiment of FIG. 2C, data collection and update manager 292 may be configured to solicit, retrieve, or access information required for operation of information manager 204 or server 106, and may be configured to store or update such information (shown as storage update information 260) in any of storages 201, 202, 203, 217, 218, 219 or 220. In a first illustrative example, data collection and update manager 292 may access (for example via the public internet) an auxiliary storage 220 containing land transaction records, and may process this information (shown as auxiliary information 269) to determine whether any producer records in producer ID storage 201 should be updated, in which case data collection and update manager 292 may write appropriate storage update information 260 to storage 201. In a second illustrative example, system 200 may, periodically or on an as-needed basis, update its map storage data order that the information is maintained as current. To do so, data collection and update manager 292 may access an auxiliary storage 220 containing geographical mapping data and may write appropriate storage update information 260 to map storage 218. In a third illustrative example, system 200 may, periodically or on an as-needed basis, update soil condition information measured by connected sensors 107 located on agricultural land of a producer known to the system.

Data collection and update manager 292 may send a request for a measurement to connected sensor 107, and may in response, receive the sensor measurement within sensor information 268. Data collection and update manager 292 may then (via the sending of appropriate storage update information 260) update a 'current status' field within a land/infrastructure record for the producer in producer ID storage 201, in accordance with the received sensor information 268. In similar examples, data collection and update manager 292 may request or receive sensor information 268 from a weather sensor such as a barometer or rain gauge and may subsequently update weather storage 217.

In order to retrieve or access some information types, data collection and update manager 292 may coordinate with administrator interface 209 or with user interaction manager 296. Thus, in a fourth illustrative example, data collection and update manager may receive administrator configuration 267 comprising for example, a change to the contact details of an equipment owner known to system 200, and may, in response, send appropriate storage update information 260 to equipment ID storage 202 to update the corresponding equipment owner record. In a fifth illustrative example, data collection and update manager 292 may request or receive a user configuration 266 from a client 102, 103 or 105, via user interaction manager 296. In examples, the user configuration 266 may comprise information relating to a new or modified service requirement record for a producer within producer ID storage 201, hence data collection and update manager 292 may update storage 201 as appropriate by sending to it suitable storage update information 260. In similar examples, an operator client 103 may upload to server 106 via user interaction manager 296, a newly gained qualification to operate a particular type of agricultural machinery. This information may be passed to data collection and update manager 292 within user configuration 266, and data collection and update manager 292 may subsequently update storage 203 as appropriate by sending to it suitable storage update information 260.

In some embodiments, agricultural management system 200 may include (for example, within an information manager 204 of server 106) an intelligent matching agent 290 which may be configured to analyze any information known to system 200 (such as stored information 270 that may be held within any of storages 201, 202, 203, 217, 218 and 219) in order to provide users of the system (such as producers, equipment owners and operators) with options for obtaining or providing agricultural services. In examples, intelligent matching agent 290 may operate to identify one or more associations or candidate pairings 261 between equipment owners and equipment operators which may then be offered to producers in order that the producer may select one or more of the candidate pairings as a service 'package' to fulfil a particular service need or requirement of the producer. It shall be appreciated that while the term "pairing" is used within this disclosure to denote a combination or association of equipment from an equipment owner and human resource for operating the equipment from an operator, the term "pairing" does not convey any limitation that the combination or association should be one-to-one.

Conversely, a candidate pairing 261 may comprise any combination, grouping or association between one or more equipment owners or pieces of equipment, and one or more operators to operate the equipment in order to fulfil a service need of a producer.

Thus, in examples, a candidate pairing 261, such as may be identified by intelligent matching agent, may comprise a single item of equipment and a plurality of operators needed to fulfil the service, or may comprise a single operator and a plurality of items of equipment that are needed to fulfil the service.

In identifying candidate pairings 261, intelligent matching agent may analyze a service requirement record within producer ID storage 201 in order to determine the equipment types, features, performances or specifications that are required or preferred for fulfilling the service and may determine equipment owners known to equipment ID storage 202 that have such equipment available. Intelligent matching agent may further analyze the service requirement record within producer ID storage 201 to identify any requirements or preferences of the producer regarding operators needed to fulfil the service and may search operator ID storage 203 to identify those operators that are suitable and/or available. Due to the fact that certain types of equipment may only be operated by suitably qualified or experienced operators, a producer requirement for a given piece of equipment may not only impose a constraint on which equipment owners are suitable, but also on which operators may be paired with that equipment.

In general, intelligent matching agent 290 may be configured to compare, analyze, cross-correlate, or filter producer records in producer ID storage 201, equipment owner records in equipment ID storage 202, and operator records in operator ID storage 203 in order to identify one or more candidate pairings 261 of equipment and operators suitable for providing a service to a producer. Inputs to the comparison, analysis, cross-correlation or filtering may comprise any two or more related fields (within producer, equipment owner or operator records) who's compatibility is to be assessed. In examples, the inputs may comprise a first field taken from within a producer record (see e.g. those of table 1), and a second related field from within an equipment owner record (see e.g. table 2). In other examples, the inputs may comprise a first field taken from within a producer record (see e.g. those of table 1), and a second (e.g. related) field from within an operator record (see e.g. table 3). In further examples, the inputs may comprise a first field taken from within an equipment owner record (see e.g. those of table 2), and a second (e.g. related) field from within an operator record (see e.g. table 3). In yet further examples, the inputs may comprise a first field taken from within a producer record (see e.g. those of table 1), a second (e.g. related) field taken from within an equipment owner record (see e.g. those of table 2), and a third (e.g. related) field from within an operator record (see e.g. table 3).

As part of its operation, intelligent matching agent 290 may further compute or assign a "field compatibility score" representative of how compatible the fields used for the comparison, analysis, cross-correlation or filtering are, for example, a score of zero may be used to denote fields that are incompatible, a score of e.g. 0.4 may indicate partial compatibility, and a score of 1 may indicate full compatibility. By means of example, a scheduling constraint field within a producer's service requirement record indicating a need for the service to be performed during the month of August may be incompatible with an operator availability field indicating the operator is already pre-booked for that month, and hence a field compatibility score of zero may be assigned by intelligent matching agent 290. Conversely, a preferences field within a general producer information record may indicate a preference for equipment suppliers to be located within 30 miles of the producer's place of business, and this may be fully compatible with a location-of-business field within a general equipment owner information record, hence a field compatibility score of 1 may be assigned by intelligent matching agent 290. In determining this compatibility score, intelligent matching agent 290 may also consult map storage 218 in order to determine the actual distance between the producer's place of business and the equipment owner's place of business and may compare this actual distance to the producer's preferred maximum distance. In other examples, fields that are incompatible may be assigned a negative value, and those that are compatible may be assigned a positive value. In some embodiments "soft" field compatibility scores may be used in between such upper and lower limits in order to indicate partial compatibility, whereas in other embodiments, field compatibility scores may be "hard" or binary, indicative of either compatible or not.

More generally, intelligent matching agent 290 may take into account compatibility of any of the following when comparing, analyzing, cross-correlating or filtering producer records, equipment owner records and operator records in order to identify candidate pairings:

a type, capability, specification or performance of a piece of equipment compared against equipment-related requirements or preferences of a producer;

a capability or experience level of an operator compared against operator-related requirements or preferences of a producer;

a reliability score of a piece of equipment compared against an equipment reliability requirement of a producer;

a feedback score, reliability information or a reputational rating of an equipment supplier or operator compared against a feedback score, reliability or reputational score requirement of a producer;

an availability of equipment and/or operator resources compared against the service scheduling requirements or preferences of a producer;

a location of equipment and/or operator resources compared against any location-based service requirements or preferences of a producer;

a current, forecast or historical weather condition compared against any weather-related service requirements or preferences of a producer;

a price for equipment or operator resources compared against any price-related requirements or preferences of a producer a required or preferred payment type, method or schedule of a paying party compared against a required or preferred payment type, method or schedule of a payee.

It shall be appreciated that the above merely represent examples of (and do not limit) the different information and record types that may be used to assess compatibility between producers, equipment owners and operators, and that further examples are possible within the scope of the present disclosure.

In some embodiments, intelligent matching agent 290 may determine an overall measure or "pairing score" representative of how well requirements and preferences of a producer (such as may be captured in a service requirement record in producer ID storage 201) match offerings of equipment from equipment owners (such as may be captured in an equipment record in equipment ID storage 202), resources and capabilities for operating equipment from operators (such as may be captured in an operator record in operator ID storage 203), or any combinations thereof. In some examples, such an overall pairing score may be determined based on a sum or weighted sum of a plurality of field compatibility scores wherein each field compatibility score represents a degree of compatibility between at least a field in a first record (e.g. a producer record) and a field in a second record (e.g. an equipment owner record or an operator record). By means of example, intelligent matching agent 290 may determine a first field compatibility score based on a comparison of a first field in a producer record with a second field in an equipment owner record.

Intelligent matching agent 290 may further determine a second field compatibility score based on a third field in a producer record with a fourth field in an operator record. Intelligent matching agent 290 may then determine an overall pairing score associated with a candidate pairing 261 based upon a sum or weighted sum of the first field compatibility score and the second field compatibility score. In some examples, different weights for the sum may be assigned or associated with different fields or field types of the producer, equipment owner or operator records in order that intelligent matching agent 290 may attribute different levels of importance to different requirements or preferences (for example of a producer). For example, fields in a producer service requirement record that are associated with requirements for operator insurance may be associated with a high weight (and therefore high importance), whereas fields in a producer service requirement record that are associated with weather requirements may be associated with a lower weight (and therefore lower importance), if for example, the service is relatively insensitive to weather conditions.

In some embodiments, intelligent matching agent 290 may rank or order a list, set or plurality of candidate pairings 261 based upon the overall pairing scores that are associated with each. As an illustrative example, intelligent matching agent 290 may identify first, second and third candidate pairings 261 that are all related to a particular producer service requirement record and may determine corresponding overall pairing scores for these of $s_1=32$, $s_2=85$, and $s_3=7$ respectively. Intelligent matching agent 290 may then, in some examples, rearrange a list of the candidate pairings in order of decreasing overall pairing score, such that the first entry in the list is the second candidate pairing ($s_2=85$), the second entry in the list is the first candidate pairing ($s_1=32$) and the third entry in the list is the third candidate pairing ($s_3=7$). In some examples, the rearranged or sorted list of candidate pairings may be sent as candidate pairings 261 to a producer client 105 (for example via user interaction manager 296) wherein at the client, the ordering of the candidate pairings 261 is preserved when displayed to a user (e.g. a producer) such that the pairings with the better overall pairing scores are appropriately highlighted. In other examples, the overall pairing scores (or other values derived from them) may be sent to the producer client 105 wherein they may be displayed alongside each of the candidate pairings 261. In yet further examples, textual or graphical highlighting may be used on the producer client 105 to emphasize those candidate pairings 261 with higher overall pairing scores.

In alternative embodiments, intelligent matching agent 290 may rank or order a list, set or plurality of candidate pairings 261 based upon criteria other than the overall pairing scores. In some examples the ranking or ordering of candidate pairings 261 may be based on a particular field of interest within a producer, equipment owner or operator record, such as a feedback score, reliability information or reputational rating, or an availability to perform the service, or a location proximity. In some examples, the field of interest or other criteria to use for the basis of the ranking or ordering may be specified as a preference within (for example) a producer record held in producer ID storage 201. Thus, in some examples, a producer may specify that he or she wishes to receive candidate pairings 261 in order of a feedback rating of the equipment owners and/or operators, and intelligent matching agent 290 may be configured to rank the candidate pairings accordingly. In other examples, a producer may specify that he or she wishes to receive candidate pairings 261 in order of a proximity of the equipment owners and/or operators to the producer's place of business, and intelligent matching agent 290 may be configured to rank the candidate pairings accordingly. In yet further examples, a producer may specify that he or she wishes to receive candidate pairings 261 in order of a reliability rating of the equipment, and intelligent matching agent 290 may again be configured to rank the candidate pairings accordingly.

In yet further alternative embodiments, intelligent matching agent 290 may rank or order a list, set or plurality of candidate pairings 261 based upon a percentage of the fields within producer records, equipment owner records and operator records that are identified to be compatible with one another.

In some embodiments, intelligent matching agent 290 may include within the candidate pairings 261, additional information comprising for example, details or specifications of the identified pieces of agricultural equipment to be provided by the equipment owner, and/or details or qualifications of the identified operator. More generally, such additional information may include any information held within equipment ID storage 202 (such as the examples listed in Table 2) or within operator storage 203 (such as the examples listed of Table 3).

In some embodiments, responsive to sending candidate pairings 261 to a user of the system (such as a producer), intelligent matching agent 290 may subsequently receive (in some examples via user interaction manager 296) further input from the user of the system. Such further user input may comprise a selection of one or more of the candidate pairings 261 originally sent, a request for additional information or details regarding one or more of the candidate pairings or of the associated parties, a modification or update to the user's requirements and so forth. Intelligent matching agent 290 may then take into account the further user input in a potential further iteration or extension of its operation. In some embodiments, user input comprising, for example, a selection of one or more of the candidate pairings (see selected pairings 262 of FIG. 2C) may instead be routed by user interaction manager 296 to booking manager and scheduler 294 to facilitate subsequent finalization of the service booking and payment.

In some embodiments, intelligent matching agent 290 may be implemented as a hardware, firmware or software process that when executed causes the computation of a measure or value associated with a degree of compatibility between a producer service requirement and a potential pairing between equipment of an equipment owner and an operator of equipment. In some examples, the measure or value may be an overall pairing score as previously described. In some examples, the overall pairing score may be based on a plurality of field compatibility scores. In some examples, the process may be executed a plurality of times for a single producer service requirement, in order to compute the measure or value for each of a corresponding plurality of potential pairings. In some embodiments, intelligent matching agent 290 may then identify a subset of all potential pairings in order to determine a set of candidate pairings 261 to send to a client, such as to producer client 105. In some examples, the subset may be those potential pairings with a measure or value that exceeds a minimum threshold or may be the "top N" potential pairings, i.e. those having the highest measures or values. These serve as examples only and any other criteria may be used to select a set of candidate pairings from within all potential pairings.

In some embodiments, intelligent matching agent 290 may be based on a computer program or code comprising instructions to follow a set of predetermined steps to calculate measures or values on which an identification of candidate pairings 261 may be based. In further embodiments, intelligent matching agent 290 may be configured to perform an iterative filtering operation to identify candidate pairings 261, wherein for example, a set of potential pairings is successively pruned or reduced via a number of serialized filtering stages until a final set of candidate pairings is identified. In examples, pairings surviving a filtering stage may be those that are determined to have one or more compatible fields within producer, equipment owner or operator records in storages 201, 202 and 203 respectively. In yet further embodiments, intelligent matching agent 290 may be based on an artificial intelligence model, neural network, or other machine learning algorithm which may, in examples, be trained to recognize and identify compatibility between information fields comprised within producer records, equipment owner records and operator records held within storages 201, 202 and 203 respectively In some embodiments, intelligent matching agent 290 may comprise one or more of the functions shown within information manager 204 in FIG. 2A such as availability coordinator 205, location manager 206, weather tracking manager 207, preference manager 208 and selection list manager 215 and may be configured to perform similar functionality (or to accomplish the same overall objectives) as these functions.

In some embodiments, agricultural management system 200 may include (for example, within an information manager 204 of server 106) a booking manager and scheduler 294 which may, in some examples, be configured to coordinate the booking and scheduling of a service amongst users of the system involved in providing or receiving the service, to update availabilities of equipment or human resources in accordance with a booked service, to reschedule services or to notify users in response to any change in circumstance or in response to an event, to manage a master calendar of booked services and/or to coordinate payment or payment terms for a service between payers and payees.

In some examples, subsequent to the candidate pairings 261 having been sent to a producer client 105, but prior to having received a selected pairing 262 or any booking confirmation or payment, booking manager and scheduler 294 may mark, label or indicate the associated equipment and operator resources as only "tentatively available" (as opposed to available) within any of storages 271 in order to help the system detect any potential conflicts or problems of double-booking.

In some examples, booking manager and scheduler 294 may receive selected pairings 262 from a user of the system (such as from a producer client 105) that indicate one or more of the candidate pairings 261 that the user would like to proceed with in order to fulfil his or her service needs. In response, booking manager and scheduler 294 may temporarily mark, label or indicate the associated equipment or operator resources as reserved or unavailable within one or more of the appropriate storages 271 via the sending of suitable scheduling and availability update information 265 to the appropriate storage(s). In some examples, booking manager and scheduler 294 may also initiate the sending of messages via scheduling coordination 263, to coordinate scheduling of the service amongst the interested parties such as to equipment client 102, to operator client 103 and/or to producer client 105. In some examples, such scheduling coordination 263 may be sent to such users of the system via user interaction manager 296. In some examples, scheduling information 263 may comprise not only messages from the booking manager and scheduler 294 to the users of the system, but also messages from users of the system to the booking manager and scheduler 294. In some examples, scheduling coordination 263 may comprise any proposed, suggested, preferred, not-preferred or alternative times or dates during which the service is or is-not to be performed, or may comprise any agreement or rejection of these by a user.

In some embodiments, booking manager and scheduler 294 may retrieve, consult, process or analyze any stored information 270 in order to determine one or more suitable times or dates to propose for scheduling of the service. In examples, booking manager and scheduler 294 may assess availability information relating to equipment owners or operators in determining a suitable schedule for the service, for example, if not already done so by intelligent matching agent 290 when deriving candidate pairings 261. In other examples, booking manager and scheduler 294 may assess weather-related information (e.g. held in weather storage 217) and weather preferences (e.g. held in a service requirement record in producer ID storage 201) in order to determine one or more scheduling options for the service to propose via scheduling coordination 263. To assess the compatibility of, for example, potential service scheduling times and dates against equipment or operator availabilities, or to assess, for example, weather conditions against weather requirements or preferences, booking manager and scheduler 294 may perform any suitable compatibility processing or analysis, such as has been described within the present disclosure for intelligent matching agent 290.

In some embodiments, booking manager and scheduler 294 may also disseminate information regarding the agricultural service to be performed, the agricultural equipment to be used and the operator resources to be used amongst the producer, equipment owner and operator parties involved in the agricultural service and pairing. Such disseminated information may include any information held within producer ID storage 201 (such as service requirements and other examples of Table 1), equipment ID storage 202 (such as equipment specifications and other examples of Table 2) or operator storage 203 (such as operator capabilities, qualifications, preference and other examples of Table 3).

Upon determining that the services to be performed and/or a schedule for the services are agreeable to all interested parties, booking manager and scheduler 294 may, in some examples, initiate the sending of messages via payment coordination 264, to coordinate payment or payment terms of the service between the interested parties such as between equipment client 102, operator client 103 and/or to producer client 105. Payment coordination 264 may comprise any preferences, proposals, acceptances or rejections of payment terms, platforms, methods or schedules. While not explicitly shown in FIG. 2C for reasons of diagrammatical clarity, payment coordination 264 may also comprise any payment details, secure communications, or other messaging with one or more financial institutions that are necessary to complete the actual payment or transfer.

In some examples, payment from the receiver of the service (such as a producer) may not be made directly to the provider of the service (such as an equipment owner or an operator) at the time of booking, and may instead be held in escrow until the service is completed or until some other event or criterion that triggers payment is fulfilled. In some examples, such events or triggers may include, but are not limited to, an acceptance or acknowledgement by the receiver of the service that the service has been completed to a satisfactory level, a time period has elapsed since the booking was confirmed or since the service was scheduled to be started or completed, or a request for payment is lodged by a provider of the service. Upon fulfilment of such criteria, booking manager and scheduler 294 may (via suitable payment coordination 264 with users or financial institutions) release payment from escrow to the service provider(s).

At any time during the booking, scheduling and payment processes, booking manager and scheduler 294 may send further scheduling and availability update information 265 to any storage within storages 271 to mark, label or indicate the associated equipment or operator resources as available or unavailable in accordance with the current status of the booking, scheduling or payment processes, or to record the current status for example in scheduled services storage 219. Also at any time during the booking, scheduling and payment processes, booking manager and scheduler 294 may send notification messages to equipment client 102, to operator client 103, to producer client 105 or to administrator client 101 to provide information on the current status of the booking, scheduling or payment processes, or to request additional information to facilitate these.

In some examples, booking manager and scheduler 294 may communicate with user interaction manager 296 to cause messages to be sent to one or more of a producer client 105, an equipment client 102, and an operator client 103, informing them that one or more services for a producer has been scheduled, and/or that they have been chosen to provide the producer service. In some embodiments, such messages may include details of the service to be provided, for example including one or more of the service location, time and date, the identification of the one or more pieces of equipment and the identification of the one or more equipment operators.

In some embodiments, booking manager and scheduler 294 may dynamically propose or coordinate the rescheduling of services that have been previously booked. Such rescheduling may be necessary or preferred in order to mitigate against an event that may otherwise preclude or hinder the ability of the service to be performed. In examples, events that may impact a scheduled service may include (but are not limited to), a current weather condition, a change in a forecast weather condition, a transportation delay, an illness or other inability of a person to perform duties necessary for the service, an equipment breakdown, malfunction or need for maintenance, a theft of equipment, a withdrawal by a service provider of a willingness to provide the service, and a withdrawal or cancellation of the service by a requestor of the service. As an illustrative example, booking manager and scheduler 294 may complete a booking for crop spraying on a producer's farm due to take place during the $2^{nd}$ week of July, using a tractor from a first equipment owner, a crop spraying attachment from a second equipment owner, and human resources from an operator. However, two days prior to the scheduled commencement of the work, data collection and update manager 292 obtains the latest weather information (for example from auxiliary storage 220 and/or from connected sensors 107) and identifies that a major and unexpected storm is due to pass through the producer's location of business during the scheduled week of the service. In response, booking manager and scheduler 294 may determine (for example, using weather preference information in producer ID storage 201) that the producer's crop spraying service is highly sensitive to rain, as the pesticide agent must remain on the leaves for a minimum of 8 hours in order for it be effective. As such, booking manager and scheduler 294 may assess the availability of the same equipment and operator for a later week in July, and may notify the producer, the first and second equipment owners and the operator (for example via suitable messages within scheduling coordination 264) of the upcoming event, its potential impact to the service and the options available for the service to be rescheduled. In response, any of the producer, the two equipment owners and the operator may accept or reject the proposal. If all accept, booking manager and scheduler 294 may subsequently update (for example via suitable scheduling and availability update information 265) a master calendar in scheduled services storage 219, may update availability of the equipment in equipment ID storage 202, or may update the availability of the operator in operator ID storage 203 according to the rescheduled booking information.

In some embodiments, booking manager and scheduler 294 may update a global calendar or timetable of scheduled services that is maintained by the agricultural management system 200, for example within scheduled services storage 219. In some embodiments, booking manager and scheduler 294 may update a calendar (for example in producer ID storage 201) for the producer that requested the service indicating that the service has been scheduled. In some embodiments, booking manager and scheduler 294 may update a calendar (for example in equipment ID storage 202) for the equipment operator indicating the pieces of equipment that are scheduled and the dates and times that the pieces of equipment are scheduled. In embodiments booking manager and scheduler 294 may update a calendar (for example within operator ID storage 203) for the one or more operators indicating that the operators are scheduled for a particular service with a particular piece of equipment and the dates and times that the operator is scheduled.

Figure 3A:
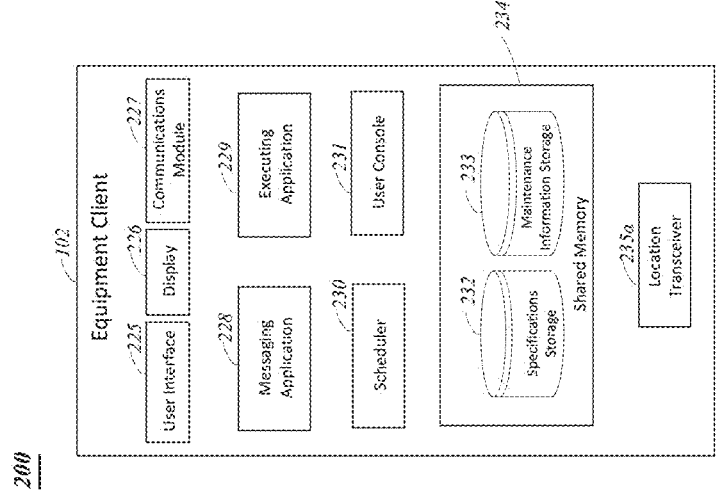
FIG. 3A depicts an example embodiment of an equipment client.

FIG. 3A, in a general overview, depicts some of the equipment client 102 architecture of an implementation of a system capable of managing agricultural services. Equipment client 102 may include a user interface 225, a display 226, a communications module 227, a messaging application 228, an executing application 229, a scheduler 230, and/or a user console 231. Equipment client 102 may include shared memory 234, which may include specifications storage 232 and maintenance information storage 233.

Referring to FIG. 3A, in more detail, an equipment client 102 may be a client device of an owner of one or more pieces of agricultural equipment, or a client device of a manager of one or more pieces of agricultural equipment, or a client device of a lessee of one or more pieces of agricultural equipment. An equipment client 102 may be a client device of a member or independent contractor working for an organization that manages agricultural equipment for one or more owners. Equipment client 102 may be any device used by the equipment owner. The equipment owner does not need to own the device for it to be considered an equipment client 102. The equipment client 102 may be any computing device, such as a desktop computer, a laptop, a mobile device, or any other computing device. In some embodiments, the equipment client 102 may be a server or set of servers accessed by the equipment owner. For example, an equipment client 102 may be a client device of an employee or a member of an organization. The equipment client 102 may be a server that is e.g. owned or managed or otherwise associated with the organization.

In some implementations, equipment client 102 may include a communications module 227. This may comprise hardware, firmware or software to facilitate a unidirectional or bidirectional exchange of communications via a physical wired or wireless communications medium. Communications module 227 may further comprise a library, application programming interface (API), a set of scripts, or any other code that may facilitate communications between equipment client 102 and any of the server 106 operator client 103, producer client 105, or any other server. In some embodiments, communications module 227 determines when to transmit information from equipment client 102 to external servers via network 104. In some embodiments, communications module 227 receives information from server 106 via network 104. In some embodiments, the information transmitted or received by communications module 227 may correspond to a message, such as an email, generated or received by the messaging application 228.

Equipment client 102 may include user console 231, which may run in the user space of the operating system. User console 231 may be configured to raise prompts, get replies, and manage interactivity with the user. In some embodiments, equipment client 102 may include user interface 225 such as a keyboard, a mouse, a touch screen, or other appropriate user interface. This may be a user interface that is e.g. connected directly to equipment client 102, such as, for example, a keyboard connected to a mobile device, or may be connected indirectly equipment client 102, such as, for example, a user interface of a client device used to access an equipment client 102. Equipment client may include a display 226, such as a screen, a monitor connected to the device in any manner, or any other appropriate display.

In an implementation, equipment client 102 may include messaging application 228. Messaging application 228 may be any application capable of viewing, editing, and/or sending messages. For example, messaging application 228 may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application 228 can be configured to display received messages and/or sent messages. Messaging application 228 can be configured to allow the equipment client 102 to generate reply messages or forwarded messages in response to the messages displayed by messaging application 228.

Equipment client 102 may include executing application 229. Executing application 229 may process inputs received by user console 231 or from communications module 227, for example from other systems related to agricultural equipment owned or managed by equipment client 102. For example, executing application 229 may receive messages from an equipment manufacturer of one or more pieces of equipment owner or managed by equipment client 102, said messages indicating a maintenance and/or service requirement of the one or more pieces of equipment.

Equipment client 102 may include scheduler 230. Scheduler 230 may be integrated with or coupled to memory or a memory store or otherwise a storage, such as a database, containing information about equipment, for example maintenance information storage 233 and/or specifications storage 232, so as to provide scheduler 230 access to parameters associated with managing preferences and availability of equipment which may be used for scheduling a particular agricultural service by e.g. the server 106. Scheduler 230 may comprise a program, service, task, script, library, application or any type and form of executable instructions or code executable on one or more processors. Scheduler 230 may be combined or separated into one or more modules, applications, programs, services, tasks, scripts, libraries, applications, or executable code.

Scheduler 230 may be configured to receive notification of a selection of a pairing of equipment and equipment operators which includes equipment managed by equipment client 102. Scheduler 230 may generate one or more messages to be sent to the one or more equipment owners of the one or more pieces of equipment in the pairing indicating that the equipment has been scheduled to provide a service. Scheduler 230 may interact with messaging application 228 and communications module 227 to send the one or more messages to the one or more equipment owners. Scheduler 230 may send an indicator to server 106 to mark the availability of the one or more pieces of equipment as tentative and/or unavailable upon generating the one or more messages to be sent to the one or more equipment owners and one or more operators. Scheduler 230 may be operable to receive messages forwarded from messaging application 228 that are received via communications module 227 from one or more equipment owners. In some embodiments, when scheduler 230 receives an acceptance message from the one or more equipment owners of the one or more pieces of equipment in the selected pairing, scheduler 230 may indicate that the one or more pieces of equipment are scheduled for the requested service for the producer.

Scheduler 230 may inform server 106 to update the availability of the one or more pieces of equipment as unavailable for the time and duration of the request service of the producer.

In some embodiments, messages may include details of the service to be provided, for example including one or more of the service location, time and date, the identification of the one or more pieces of equipment.

Equipment client 102 may include specifications storage 232, which may include all of the specifications and parameters for one or more pieces of equipment controlled by the equipment owner or manager of equipment client 102. In some examples, specifications storage 232 may include the make and model of the equipment, the size of the equipment, the horsepower of the equipment, the age of the equipment, the number of hours of operation on the piece of equipment, the type of fuel used by the equipment, and general shape of the equipment, the last service date of the equipment, the next scheduled service date of the equipment, the entire maintenance history of the equipment, the entire ownership history of the equipment, and/or any other information about the specific piece of equipment. More generally, specifications storage 232 may also comprise any of the information fields associated with an equipment record in equipment ID storage 202 (see Table 2 for examples).

Equipment client 102 may also include maintenance information storage 233, which may include information relating to the maintenance needs and schedule of agricultural equipment controlled by the equipment owner or manager of equipment client 102.

Each of the equipment client 102, messaging application 228, executing application 229, user console 231, scheduler 230, and communications module 227 may comprise a program, service, task, script, library, application or any type and form of executable instructions or code executable on one or more processors. Any of the equipment client 102, messaging application 228, executing application 229, user console 231, scheduler 230, and communications module 227 may be combined into one or more modules, applications, programs, services, tasks, scripts, libraries, applications, or executable code.

In some embodiments, the input for one or more SMS messages, text messages, email messages or any other messages sent or received by equipment client 102 includes a string. In some embodiments, the string may identify, contain or provide the body of the message. In some embodiments, the string comprises an identifier to file that has the body of the message. In some embodiments, the string comprises an identifier or key to a record or data in a database that has the body of the message or the content of the message. In some embodiments, the string indicates who or where the message is from. In some embodiments, the string may indicate a reply to address for the message.

In some embodiments, equipment client 102 may include a location transceiver 235a. In examples, location transceiver 235a may comprise a location antenna useful for receiving and processing satellite or radio navigation signals in order to determine a location of the equipment client 102. Location transceiver 235a may store measured locations and may communicate these to executing application 229 or to communications module 227 for onward forwarding to server 106 via one or more networks 104. Location technologies supported by location transceiver 235a may include satellite-based technologies such as, but not limited to, the Global Positioning System (GPS), Globalnaya Navigatsionnaya Sputnikovaya Sistema or GLObal NAvigation Satellite System (GLONASS), Galileo, or BeiDou. Alternatively, terrestrial-based or cellular radio location technologies may be supported by location transceiver 235a.

In some embodiments, equipment client 102 may be configured to upload, to server 106, information comprised within specifications storage 232 or maintenance information storage 233, equipment owner preferences (such as the examples provided in Table 2) and any other information generated or stored through the operation of equipment client 102.

Figure 3B:
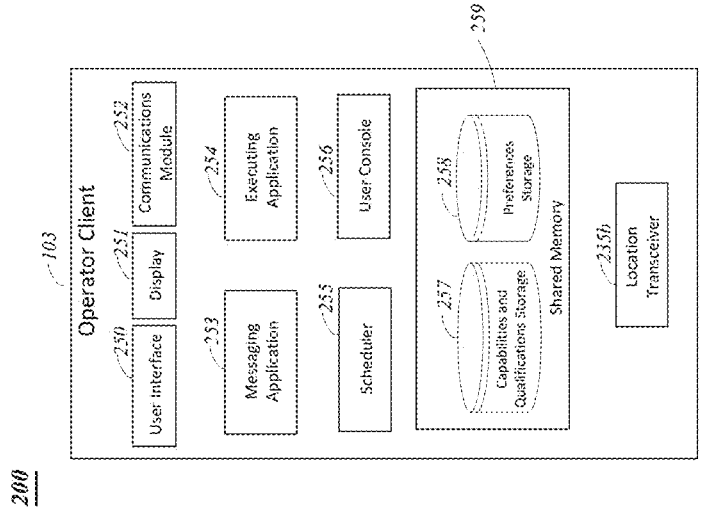
FIG. 3B depicts an example embodiment of an operator client.

In a general overview, FIG. 3B depicts some of the operator client 103 architecture of an implementation of a system capable of managing agricultural services. Operator client 103 may include a user interface 250, a display 251, a communications module 252, a messaging application 253, an executing application 254, a scheduler 255, and/or a user console 256. Operator client 103 may include shared memory 259, which may include capabilities and qualifications storage 257 and preferences storage 258.

Referring to FIG. 3B, in more detail, operator client 103 may be a client device of an operator capable of operating of one or more pieces of agricultural equipment, or a client device of a manager of operators capable of operating one or more pieces of agricultural equipment, or a client device of a cooperative of operators capable of operating of one or more pieces of agricultural equipment. An operator client 103 may be a client device of a member or independent contractor working for an organization that manages agricultural equipment operators. Operator client 103 may be any device used by the operator. The operator does not need to own the device for it to be considered an operator client device 103. Operator client 103 may be any computing device, such as a desktop computer, a laptop, a mobile device, or any other computing device. In some embodiments, the operator client 103 may be a server or set of servers accessed by the operator. For example, an operator client 103 may be a client of an employee or a member of an organization. An operator client 103 may be a server that is e.g. owned or managed or otherwise associated with the organization.

In some implementations, operator client 103 may include a communications module 252. This may comprise hardware, firmware or software to facilitate a unidirectional or bidirectional exchange of communications via a physical wired or wireless communications medium. Communications module 252 may further comprise a library, application programming interface (API), a set of scripts, or any other code that may facilitate communications between operator client 103 and any of the server 106, equipment client 102, producer client 105, or any other server. In some embodiments, communications module 252 determines when to transmit information from operator client 103 to external servers via network 104. In some embodiments, communications module 252 receives information from server 106 via network 104. In some embodiments, the information transmitted or received by communications module 252 may correspond to a message, such as an email, generated or received by messaging application 253.

Operator client 103 may include user console 256, which may run in the user space of the operating system. User console 256 may be configured to raise prompts, get replies, and take care of everything that needs to be done interactively with the user. In some embodiments, operator client 103 may include user interface 250 such as a keyboard, a mouse, a touch screen, or other appropriate user interface. This may be a user interface that is e.g. connected directly to operator client 103, such as, for example, a keyboard connected to a mobile device, or may be connected indirectly operator client 103, such as, for example, a user interface of a client device used to access an operator client 103. Operator client 103 may include a display 251, such as a screen, a monitor connected to the device in any manner, or any other appropriate display.

In an implementation, operator client 103 may include messaging application 253. Messaging application 253 may be any application capable of viewing, editing, and/or sending messages. For example, messaging application 253 may be an instance of an application that allows viewing of a desired message type, such as any web browser, a Gmail™ application (Google, Mountain View, California), Microsoft Outlook™ (Microsoft, Seattle, Washington), WhatsApp™ (Facebook, Menlo Park, California), a text messaging application, or any other appropriate application. In some embodiments, messaging application 253 can be configured to display received messages and/or sent messages. Messaging application 253 can be configured to allow the operator client 103 to generate reply messages or forwarded messages in response to the messages displayed by messaging application 253.

Operating client 103 may include executing application 254. Executing application 254 may process inputs received by user console 256 or from communications module 252, for example from other systems related to qualifications or operator client 103. For example, executing application 254 may receive messages from equipment operator certification board of certifications of operator client 103, said messages indicating an upcoming renewal date for equipment operator certifications.

Operator client 103 may include scheduler 255. Scheduler 255 may be integrated with or coupled to memory or a memory store or otherwise a storage, such as a database, containing information about the operator, for capabilities and qualifications storage 257 and/or preferences storage 258, so as to provide scheduler 255 access to parameters associated with managing preferences, the availability and the capabilities of an operator which may be used for scheduling a particular agricultural service by e.g. the server 106. Scheduler 255 may comprise a program, service, task, script, library, application or any type and form of executable instructions or code executable on one or more processors. Scheduler 255 may be combined or separated into one or more modules, applications, programs, services, tasks, scripts, libraries, applications, or executable code.

Scheduler 255 may be configured to receive notification of a selection of a pairing of equipment and equipment operators which includes the operator of operator client 103. Scheduler 255 may generate one or more messages to be sent to the operator of the one or more pieces of equipment in the pairing indicating that the operator has been scheduled to provide a service. Scheduler 255 may interact with messaging application 253 and communications module 252 to send the one or more messages to the equipment operator. Scheduler 255 may send an indicator to server 106 to mark the availability of the operator as tentative and/or unavailable upon generating the one or more messages to be sent to the operator. Scheduler 255 may be operable to receive messages forwarded from messaging application 253 that are received via communications module 252 from the operator. In some embodiments, when scheduler 255 receives an acceptance message from the operator in the selected pairing, scheduler 255 may indicate that the operator is scheduled for the requested service for the producer. Scheduler 255 may inform server 106 to update the availability of the operator as unavailable for the time and duration of the requested service of the producer. In some embodiments, messages may include details of the service to be provided, for example including one or more of the service location, time and date, the identification of the operator.

Operator client 103 may include capabilities and qualifications storage 257, which may include all of the capabilities and qualifications that the operator holds and/or maintains to legally operate one or more pieces of equipment. In some examples, capabilities and qualifications storage 257 may include a list of capabilities or qualifications of the operator in addition to further details such as the expiry date of a qualification certificate and so forth. In some examples, the capabilities and qualifications of the operator for a specific piece of equipment may include the make and model of the equipment, the size of the equipment, the horsepower of the equipment, and the number of hours that the operator has operated that type of equipment, the date of the last time the operator operated that type of equipment, an indication of the reliability and/or the quality of service for that operator operating that type of equipment, and/or any other information about the operator with respect to one or more specific pieces of equipment. More generally, capabilities and qualifications storage 257 may comprise any of the information fields associated with an operator capability record in operator ID storage 203 (see Table 3 for examples).

Operator client 103 may also include preferences storage 258, which may include all of the preferences that the operator holds. Preferences stored in the preferences storage 258 may include a whitelist, blacklist and/or ranking of producers that the operator client 103 will accept pairings for. In some examples, a whitelist, blacklist and/or ranking of equipment, and/or equipment owners and managers that the operator will accept a pairing with may be stored in preferences storage 258. In some embodiments, operator preferences stored in preferences storage 258 may include times of the day, days of the month, and/or months of the year, and/or any other time-based preferences or time-based restrictions of the operator. In examples, operator preferences stored in preferences storage 258 may include a preferred and/or minimum hourly, daily, or other wage or rate of pay for the operator. In some embodiments, operator preferences stored in preferences storage 258 may include a minimum or maximum duration of service to be provided. In examples, operator preferences stored in preferences storage 258 may include preferred or restricted locations that the operator will provide services to, or e.g., a maximum distance that the operator is willing to travel to provide a service. Operator preferences storage 258 may include a preference of the operator to meet the equipment at the service site, or for the operator to pick up the equipment and to bring it to the service site. Operator preferences storage may include any other preferences necessary for the information manager to create pairings for providing an agricultural service to a producer. More generally, preferences storage 258 may comprise any of the information fields associated with an operator record in operator ID storage 203 (see Table 3 for examples).

Each of the operator client 103, messaging application 253, executing application 254, user console 256, scheduler 255, and communications module 252 may comprise a program, service, task, script, library, application or any type and form of executable instructions or code executable on one or more processors. Any of the operator client 103, messaging application 253, executing application 254, user console 256, scheduler 255, and communications module 252 may be combined into one or more modules, applications, programs, services, tasks, scripts, libraries, applications, or executable code.

In some embodiments, the input for one or more SMS messages, text messages, email messages or any other messages sent or received by operator client 103 includes a string. In some embodiments, the string may identify, contain or provide the body of the message. In some embodiments, the string comprises an identifier to file that has the body of the message. In some embodiments, the string comprises an identifier or key to a record or data in a database that has the body of the message or the content of the message. In some embodiments, the string indicates who or where the message is from. In some embodiments, the string may indicate a reply to address for the message.

In some embodiments, operator client 103 may include a location transceiver 235*b*. In examples, location transceiver 235*b* may comprise a location antenna useful for receiving and processing satellite or radio navigation signals in order to determine a location of the operator client 103. Location transceiver 235*b* may store measured locations and may communicate these to executing application 254 or to communications module 252 for onward forwarding to server 106 via one or more networks 104. Location technologies supported by location transceiver 235*b* may include satellite-based technologies such as, but not limited to, the Global Positioning System (GPS), Globalnaya Navigatsionnaya Sputnikovaya Sistema or GLObal NAvigation Satellite System (GLONASS), Galileo, or BeiDou. Alternatively, terrestrial-based or cellular radio location technologies may be supported by location transceiver 235*b*.

In some embodiments, operator client 103 may be configured to upload, to server 106, information comprised within capabilities and qualifications storage 257, preferences storage 258 or any other information generated or stored through the operation of operator client 103.

Figure 3C:
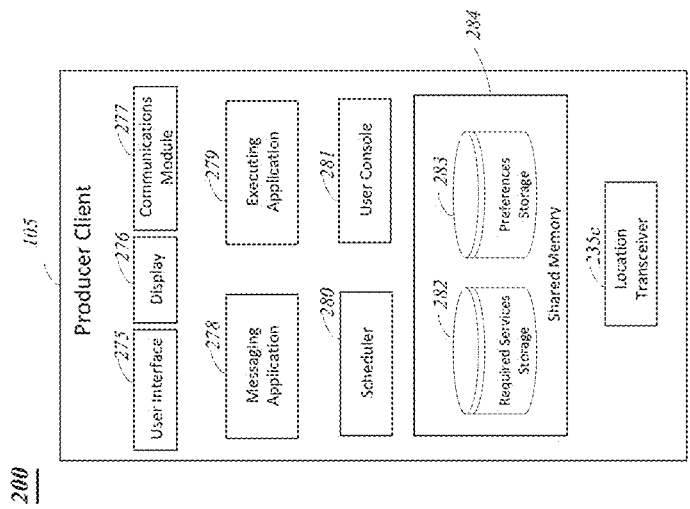
FIG. 3C depicts an example embodiment of a producer client.

In a general overview, FIG. 3C depicts some of the producer client 105 architecture of an implementation of a system capable of managing agricultural services. Producer client 105 may include user interface 275, display 276, communications module 277, messaging application 278, executing application 279, scheduler 280, and/or user console 281. Producer client 105 may include shared memory 284, which may include required services storage 282 and preferences storage 283.

Referring to FIG. 3C, in more detail, a producer client 105 may be a client device of an owner of one or more pieces of agricultural land, or a client device of a manager of one or more pieces of land equipment, or a client device of a lessee of one or more pieces of agricultural land, for which services need to be provided. A producer client 105 may be a client device of a manager of a cooperative organization that manages agricultural land for one or more landowners. Producer client 105 may be associated with the entirety or only a portion of the land owned or managed by a producer. The producer client 105 may be any computing device, such as a desktop computer, a laptop, a mobile device, or any other computing device. In some embodiments, producer client 105 may be a server or set of servers accessed by a producer. For example, a producer client 105 may be a client device of an employee or a client device of a member of the producer. Producer client 105 may access a server that is e.g. owned or managed or otherwise associated with the producer. Such a server may be a producer client 105.

In some implementations, producer client 105 may include a communications module 277. This may comprise hardware, firmware or software to facilitate a unidirectional or bidirectional exchange of communications via a physical wired or wireless communications medium. Communications module 277 may further comprise a library, application programming interface (API), a set of scripts, or any other code that may facilitate communications between producer client 105 and any of the server 106, operator client 103, equipment client 102, or any other server. In some embodiments, communications module 277 determines when to transmit information from producer client 105 to external servers via network 104. In some embodiments, communications module 277 receives information from server 106 via network 104. In some embodiments, the information transmitted or received by communications module 277 may correspond to a message, such as an email, generated or received by the messaging application 278.

Producer client 105 may include user console 281, which may run in the user space of the operating system. User console 281 may be configured to raises prompts, get replies, and take care of everything that needs to be done interactively with the user. In some embodiments, producer client 105 may include user interface 275 such as a keyboard, a mouse, a touch screen, or other appropriate user interface. This may be a user interface that is e.g. connected directly to producer client 105, such as, for example, a keyboard connected to a mobile device, or may be connected indirectly producer client 105, such as, for example, a user interface of a client device used to access producer client 105. Producer client may include a display 276, such as a screen, a monitor connected to the device in any manner, or any other appropriate display.

In an implementation, producer client 105 may include messaging application 278. Messaging application 228 may be any application capable of viewing, editing, and/or sending messages. For example, messaging application 278 may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application 278 can be configured to display received messages and/or sent messages. Messaging application 278 can be configured to allow producer client 105 to generate reply messages or forwarded messages in response to the messages displayed by messaging application 278.

Producer client 105 may include executing application 279. Executing application 279 may process inputs received by user console 281 or from communications module 277, for example from other systems related to agricultural land owned or managed by producer client 105. For example, executing application 279 may receive messages from a soil sensor monitoring system, capable of monitoring agricultural land to determine, for example, when the land needs to be irrigated or turned, said messages indicating a service requirement of the one or more pieces of agricultural land.

Producer client 105 may include scheduler 280. Scheduler 280 may be integrated with or coupled to memory or a memory store or otherwise a storage, such as a database, containing information about services required for agricultural land, livestock or property (for example required services storage 282) and/or producer preferences (for example from preferences storage 283), so as to provide scheduler 280 access to parameters associated with managing preferences and service requirements which may be used for scheduling a particular agricultural service by e.g. the server 106. Scheduler 280 may comprise a program, service, task, script, library, application or any type and form of executable instructions or code executable on one or more processors. Scheduler 280 may be combined or separated into one or more modules, applications, programs, services, tasks, scripts, libraries, applications, or executable code.

Scheduler 280 may be configured to receive notification of a selection of a pairing of equipment and equipment operators from user console 281 or user interface 275. Scheduler 280 may generate one or more messages to be sent to the one or more agricultural landowners or manager indicating that the pairing of equipment and operator has been scheduled to provide a service. Scheduler 280 may interact with messaging application 278 and communications module 277 to send the one or more messages to the one or more agricultural landowners. Scheduler 280 may be operable to receive messages forwarded from messaging application 278 that are received via communications module 277 from one or more agricultural landowners or managers. In some embodiments, when scheduler 280 receives an acceptance message from the one or more agricultural land owners or managers of the selected pairing, scheduler 280 may inform server 106 to update the availability of the one or more pieces of equipment as unavailable for the time and duration of the request service of the producer. In some embodiments, messages may include details of the service to be provided, for example including one or more of the service location, time and date, the identification of the one or more pieces of equipment and one or more operators of equipment.

Producer client 105 may include required services storage 282, which may include all of the services for the one or more pieces of agricultural land controlled by the landowner or manager of producer client 105. In some examples, required services storage 282 may include the type of agricultural land, the location of the agricultural land, the nature of the services requires, the timing of the services required, whether or not the producer is willing to pick up the equipment and transport it to the land, the price that the producer is willing to pay for the required services, the amount of time after the producer has received the service before the payment for the service will be transferred to the equipment manager and to the equipment operator, and any other information related to the required services of the producer. More generally, required services storage 282 may comprise any of the information fields associated with a service requirement record in producer ID storage 201 (see Table 1 for examples).

Producer client 105 may include preferences storage 283, which may include all of the preferences that the agricultural landowner maintains. Preferences stored in the preferences storage 283 may include a whitelist and/or blacklist of equipment and/or equipment operators that the producer is willing to accept. In some embodiments, producer preferences stored in preferences storage 283 may include times of the day, days of the month, and/or months of the year, and/or any other time-based preferences or time-based restrictions of the services provided to the producer. In examples, producer preferences stored in preferences storage 283 may include a preferred and/or minimum hourly, daily, or other wage or rate of pay for an operator and piece of equipment pairing, or for an operator and a piece of equipment individually. In some embodiments, producer preferences stored in preferences storage 283 may include a maximum distance that the producer is willing to travel to collect a piece of equipment and/or an operator of a piece of equipment. Producer preferences storage 283 may include a preference of the producer to have the equipment delivered to the service site. Producer preferences storage 283 may include any other preferences necessary for the information manager to create pairings for providing an agricultural service to the producer. More generally, preferences storage 283 may comprise any of the information fields associated with a producer record in producer ID storage 201 (see Table 1 for examples).

Each of the producer client 105, messaging application 278, executing application 279, user console 281, scheduler 280, and communications module 277 may comprise a program, service, task, script, library, application or any type and form of executable instructions or code executable on one or more processors. Any of the producer client 105, messaging application 278, executing application 279, user console 281, scheduler 280, and communications module 277 may be combined into one or more modules, applications, programs, services, tasks, scripts, libraries, applications, or executable code.

In some embodiments, the input for one or more SMS messages, text messages, email messages or any other messages sent or received by producer client 105 includes a string. In some embodiments, the string may identify, contain or provide the body of the message. In some embodiments, the string comprises an identifier to file that has the body of the message. In some embodiments, the string comprises an identifier or key to a record or data in a database that has the body of the message or the content of the message. In some embodiments, the string indicates who or where the message is from. In some embodiments, the string may indicate a reply to address for the message.

In some embodiments, producer client 105 may include a location transceiver 235c. In examples, location transceiver 235c may comprise a location antenna useful for receiving and processing satellite or radio navigation signals in order to determine a location of the producer client 105. Location transceiver 235c may store measured locations and may communicate these to executing application 279 or to communications module 277 for onward forwarding to server 106 via one or more networks 104. Location technologies supported by location transceiver 235c may include satellite-based technologies such as, but not limited to, the Global Positioning System (GPS), Globalnaya Navigatsionnaya Sputnikovaya Sistema or GLObal NAvigation Satellite System (GLONASS), Galileo, or BeiDou. Alternatively, terrestrial-based or cellular radio location technologies may be supported by location transceiver 235c.

In some embodiments, producer client 105 may be configured to upload, to server 106, information comprised within required services storage 282, preferences storage 283 or any other information generated or stored through the operation of producer client 105.

Figure 3D:
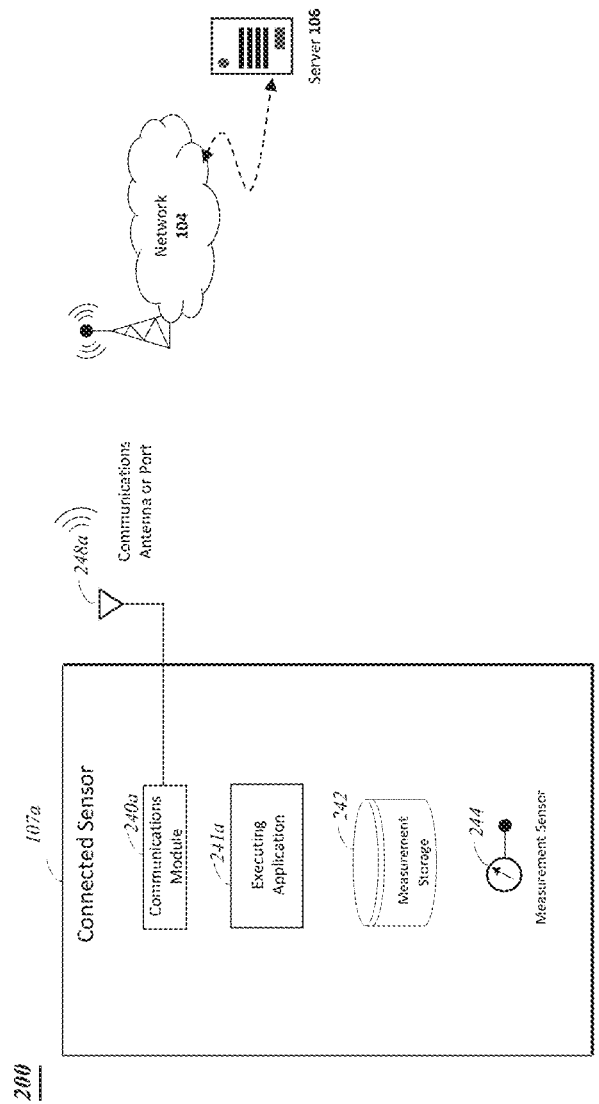
FIG. 3D depicts an example embodiment of a connected sensor suitable for communicating a measurement.

FIG. 3D depicts an example embodiment of a connected sensor 107a suitable for communicating a measurement. Connected sensor 107a may include a communications module 240a coupled to a communications antenna or port 248a, an executing application 241a, measurement storage 242 and a measurement sensor 244.

Communications module 240a may comprise hardware, firmware or software to facilitate a unidirectional or bidirectional exchange of communications via a physical wired or wireless communications medium. Communications module 240a may further comprise a library, application programming interface (API), a set of scripts, or any other code that may facilitate communications between connected sensor 107a and server 106, clients 101, 102, 103, and 105, or any other server or client entity.

Connected sensor 107a may include executing application 241a. Executing application 241a may process instructions, control or other communications received (for example from a server) via communications module 240a and communications antenna or port 248a, may access measurements stored within measurement storage 242, and/or may communicate control information to measurement sensor 244 (for example to instruct the taking of a measurement). Executing application 241a may also coordinate the transmission of measurements (as may be held in measurement storage 242) via communications module 240a and communications antenna or port 248a to a server such as server 106. In some examples, executing application 241a may coordinate a periodic transmission of measurements according to a schedule for transmission received from a server. In other examples, executing application 241a may coordinate an on-demand transmission of measurements according to requests for transmission received from a server.

Measurements transmitted by connected sensor 107a may be transmitted to a server (such as server 106) via a fixed or mobile network 104.

Measurement sensor 244 may be any type of sensor. Examples of measurement sensors 244 of relevance to agricultural management system 200 may include (but are not limited to), weather sensors (for example, anemometers, thermometers, barometers and rain gauges), soil condition monitoring sensors (such as soil moisture or temperature sensors), occupancy or weight sensors (for example to determine an amount, weight, volume or capacity used or remaining in a storage container), fluid flow or pressure sensors (for example to determine irrigation performance) and so on.

Figure 3E:
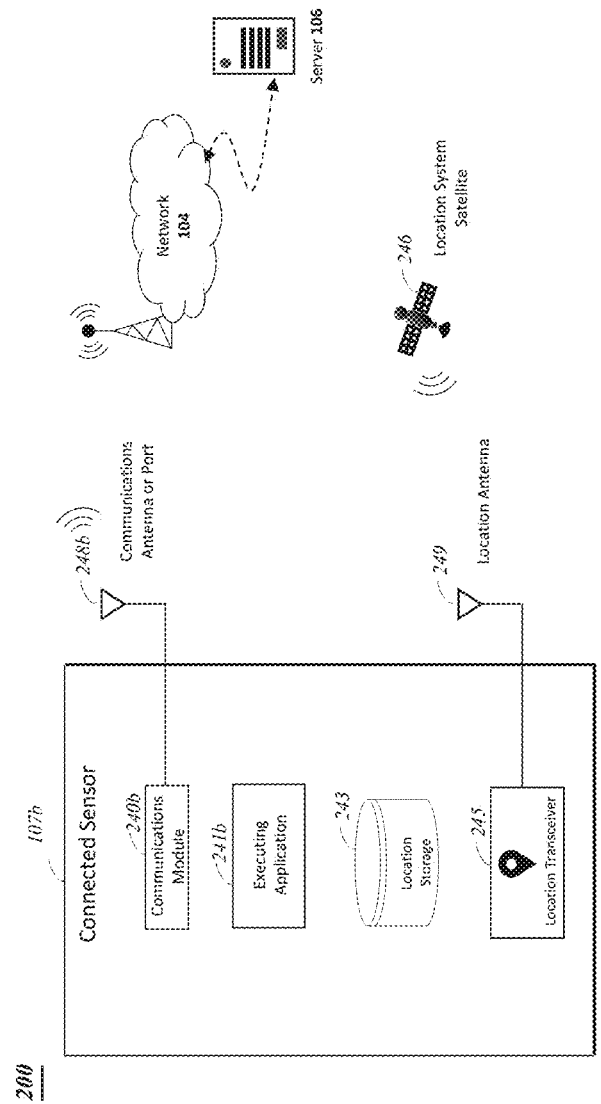
FIG. 3E depicts an example embodiment of a connected sensor suitable for communicating a location.

FIG. 3E depicts an example embodiment of a connected sensor suitable for communicating a location.

Connected sensor 107b may include a communications module 240b coupled to a communications antenna or port 248b, an executing application 241b, location storage 243 and a location transceiver 245.

Communications module 240b may comprise hardware, firmware or software to facilitate a unidirectional or bidirectional exchange of communications via a physical wired or wireless communications medium. Communications module 240b may further comprise a library, application programming interface (API), a set of scripts, or any other code that may facilitate communications between connected sensor 107a and server 106, clients 101, 102, 103, and 105, or any other server or client entity.

The connected sensor 107b of FIG. 3E may be particularly suited to the reporting of location measurements for asset tracking purposes, wherein the assets to be tracked are pieces or items of agricultural equipment. In examples, connected sensor 107b may therefore be attached to a tractor, to an ancillary piece of equipment such as an implement or attachment, or to any other unit of agricultural equipment whether large or small.

In order to measure its location, connected sensor 107b may include a location transceiver 245. In examples, location transceiver 245 may be coupled to a location antenna 249 (which may be physically separate-to or conjoined-with communications antenna or port 248b) useful for receiving satellite or radio navigation signals, such as may be transmitted by a location system satellite 246. Location technologies supported by location transceiver 245 may include satellite-based technologies such as, but not limited to, the Global Positioning System (GPS), Globalnaya Navigatsionnaya Sputnikovaya Sistema or GLObal NAvigation Satellite System (GLONASS), Galileo, or BeiDou. Alternatively, terrestrial-based or cellular radio location technologies may be supported by location transceiver 245.

Connected sensor 107b may include executing application 241b. Executing application 241b may process instructions, control or other communications received (for example from a server) via communications module 240b and communications antenna or port 248b, may access location measurements and information stored within locations storage 243, and/or may communicate control information to location transceiver 245 (for example to control the periodicity of location measurements, to instruct the taking of a location measurement, to select a satellite location system type to use for location measurements and so forth). Executing application 241b may also coordinate the transmission of location measurements (as may be held in location storage 243) via communications module 240b and communications antenna or port 248b to a server such as server 106. In some examples, executing application 241b may coordinate a periodic transmission of location measurements according to a schedule for transmission received from a server. In other examples, executing application 241b may coordinate an on-demand transmission of location measurements according to requests for transmission received from a server.

Location measurements transmitted by connected sensor 107b may be transmitted to a server (such as server 106) via a fixed or mobile network 104.

Figure 4:
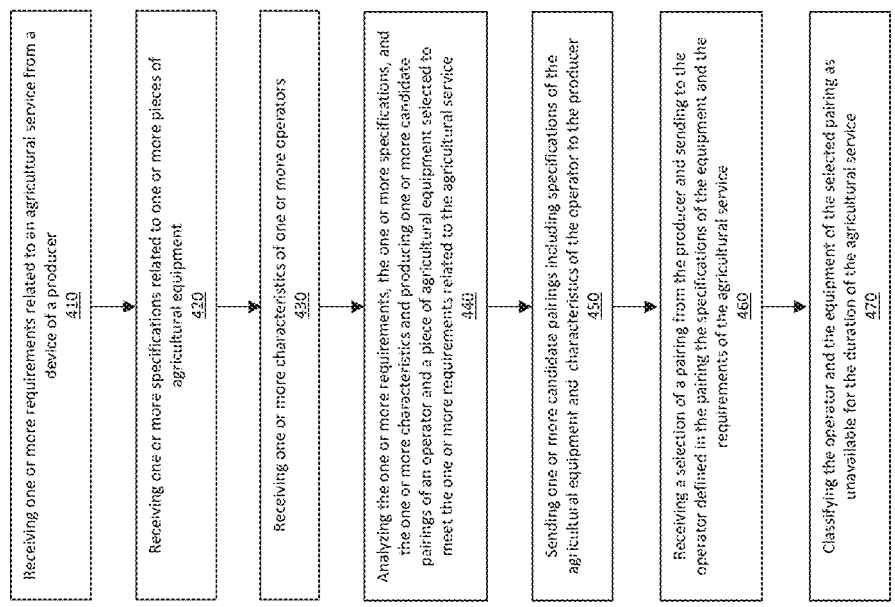
FIG. 4 depicts an implementation of a method for selecting equipment and operators necessary to provide agricultural services.

In a general overview, FIG. 4 depicts an implementation of a method 400 for selecting equipment and operators necessary to provide agricultural services. In step 410, the method 400 may include receiving, by an information manager 204, one or more requirements related to an agricultural service from a device of a producer. In some examples, the method 400 may include receiving, by the information manager 204, one or more specifications related to one or more pieces of agricultural equipment (step 420).

Method 400 may include receiving, by the information manager 204, one or more characteristics related to one or more operators (step 430). In some embodiments, method 400 may include analyzing, by the information manager 204, the one or more requirements, the one or more specifications, and the one or more characteristics and may further include producing, by the information manager 204, one or more candidate pairings of an operator of the one or more operators and a piece of agricultural equipment of the one or more pieces of agricultural equipment, the one or more candidate pairings selected to meet the one or more requirements related to the agricultural service (step 440). Method 400 may include sending, by the information manager 204, the one or more candidate pairings to the device of the producer, wherein the candidate pairings include one or more of the specifications of the agricultural equipment and one or more characteristics of the operator of each pairing (step 450). In step 460, method 400 may include receiving, by the information manager 204, a selected pairing of the one or more candidate pairings from the device of the producer. Method 400 may further include sending, by the information manager 204, to a device of the operator defined in the selected pairing, one or more of the specifications of the piece of agricultural equipment identified in the selected pairing, and one or more of the requirements related to the agricultural service. In step 470, method 400 may include classifying, by the information manager 204, the operator and the agricultural equipment of the selected pairing as unavailable for the duration of the agricultural service.

Referring to FIG. 4 in more detail, step 410 may include, in some examples, the producer client specifying a type of service to be performed. In some examples the producer client may specify the location of the service to be performed, and/or the earliest day and time the service may be performed, and/or the latest day and time the service may be performed. In some embodiments, the producer client may specify one or more preferences associated with the agricultural service to be performed. For example, the producer client may indicate a preference for one or more operators to perform the agricultural service, and/or one or more equipment providers to provide equipment to perform the agricultural service. In some embodiments, the producer client may indicate a reliability rating requirement for one or more of the equipment and/or the operator.

Requirements specified by the producer client may be requirements that need to be met, also referred to as "hard" requirements, or requirements that should be met, also referred to as "soft" requirements.

The producer client may retrieve preferences from preference storage 283 and may retrieve information regarding required services from required services storage 282. In some examples, required services in required services storage 282 are stored along with specific requirements for those services. In some embodiments, a user enters requirements into the user console 281 using the user interface 275. In embodiments, the producer client sends the requirements and/or preferences to the server 106 using the producer client communications module 277, and the server 106 receives the producer client requirements and/or preferences via a user interaction manager 296.

Requirements and/or preferences received at the server 106 via the user interaction manager 296 may be processed by the information manager 204. In some examples, requirements and/or preferences for a producer may be stored with the producer's information in the producer ID storage 201. In some embodiments, requirements and/or preferences may be related to a specific service request.

In some examples, the method 400 may include receiving, by the information manager 204, one or more specifications related to one or more pieces of agricultural equipment (step 420). In some examples, a specification may be any property of the agricultural equipment as previously described, including make and/or model, date or year of manufacture, maintenance history, owner history, repair history, reliability history and/or rating, etc. In embodiments, the received one or more specifications of the agricultural equipment are received by information manager 204 and may be stored in equipment ID storage 202 with the equipment record for that piece of equipment. The equipment client 102 may retrieve specifications from specifications storage 232, and/or may retrieve maintenance information from the maintenance information storage 233. In some embodiments, a user enters requirements into the user console 231 using the user interface 225. In embodiments, the equipment client 102 sends the specifications to the server 106 using the equipment client communications module 227, and the server 106 receives the equipment client specifications via a user interaction manager 296.

Specifications received at server 106 via the user interaction manager 296 are processed by information manager 204. In some embodiments, equipment specifications may be related to a specific piece of equipment or to a specific service request.

Method 400 may include receiving, by the information manager 204, one or more characteristics related to one or more operators (step 430). In some examples, operator characteristics may be any property of an equipment operator as previously described, including but not limited to qualifications, capabilities, certifications, location, availability, preferences and so forth. In embodiments, the received one or more characteristics of the agricultural equipment operator may be received by information manager 204 and may be stored in operator ID storage 203 with the record for that operator. Operator client 103 may retrieve characteristics from capabilities and qualifications storage 257 and/or from preferences storage 258. In some embodiments, a user enters characteristics into the user console 256 using the user interface 250. In embodiments, the operator client 103 sends the characteristics to server 106 using the operator client communications module 252, and server 106 receives the operator client characteristics via a user interaction manager 296.

Characteristics received at server 106 via user interaction manager 296 are processed by information manager 204. In some embodiments, operator characteristics may be related to a specific service request.

In some embodiments of method 400, information manager 204 may, in step 440, create more than one candidate pairing with the same operator and different pieces of equipment, and/or may create more than one candidate pairing with the same piece of equipment and different operators. In some embodiments, the information manager 204 may create candidate pairings of equipment and operators that have availability at the required time of the service. In some embodiments, the information manager 204 may create pairings of equipment and operators that are located within a specified geographic distance of the required service. In some embodiments, information manager 204 may create pairings of equipment and operators that are located close to each other, for example a piece of equipment and an operator that are within a maximum number of miles of each other. In some examples, information manager 204 may create pairings of equipment and operators that satisfy the greatest percentage of producer preferences and requirements.

In some embodiments, the information manager creates a list of candidate pairings of equipment and operators. In some examples, the list is sorted based on the best match of the pairing to the producer preferences and requirements. In some examples, each candidate pairing has an indicator, the indicator showing the percentage of producer preference and requirements that the pairing fulfils.

In some embodiments, method 400 may include, in step 450, the information manager 204 sending the one or more candidate pairings including specifications of the agricultural equipment and characteristics of the operator to the producer client 105 via user interaction manager 296. In examples, the producer client 105 receives the one or more candidate pairings via producer client communications module 277.

In some embodiments, method 400 may include in step 460, information manager 204 receiving the selected pairing from the producer client 105 via user interaction manager 296. In examples, the producer client 105 may send the selected pairing via producer client communications module 277.

In some embodiments, method 400 may also include in step 460, information manager 204 sending the one or more specifications of the piece of agricultural equipment and the one or more requirements related to the agricultural service to the operator client 103 defined in the selected pairing via user interaction manager 296. In examples, the operator client 103 receives the one or more pairings via operator client communications module 252.

Method 400 may also include classifying, by the information manager, the operator and the agricultural equipment of the selected pairing as unavailable for the duration of the agricultural service (step 470). In some examples, information manager 204 indicates a status for the operator and equipment and may store this status in an equipment record within equipment ID storage 202, and in an operator record within operator ID storage 203.

While some descriptions within the present disclosure are based on an embodiment of the information manager 204 within a server 106, it shall be appreciated that this serves as only one example. Other embodiments are also possible in which some or all functionality of information manager 204 is performed by a client 102, 103 or 105 rather than by a server 106 or is otherwise distributed between the client and server.

Variations in server architecture and embodiments are also possible. For example, the server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

The systems and methods described may provide multiple ones of any or each of the described components and these components may be provided on either a standalone machine or, in some embodiments, on multiple machines in a distributed system. The systems and methods described may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A computer-implemented method for scheduling equipment and an operator necessary to provide an agricultural service to a producer, the method to be carried out by at least one processor executing computer instructions, the method comprising;
    obtaining, by an information manager, a producer record including a plurality of producer information fields about the producer, one or more equipment supplier records including a plurality of associated equipment records for one or more pieces of equipment controlled by one or more equipment suppliers, and one or more operator records including a plurality of operator information fields about one or more operators;
    receiving, by the information manager, one or more agricultural service requirements related to the agricultural service;
    determining a plurality of pairing scores between the one or more agricultural service requirements, the plurality of associated equipment records, and the one or more operator records based on compatibility scores;
    producing, by the information manager for the agricultural service and according to the plurality of pairing scores, one or more candidate pairings comprising an operator of the one or more operators and a piece of equipment of the one or more pieces of equipment; and
    sending, by the information manager, the one or more candidate pairings to a device of the producer;
    scheduling the agricultural service according to a selection by the producer from the one or more candidate pairings;
    updating a global calendar of scheduled agricultural services between a plurality of producers, a plurality of operators, and a plurality of pieces of equipment with the agricultural service;
    communicating control information to an agricultural measurement sensor to control the agricultural measurement sensor to take an agricultural measurement, the agricultural measurement including at least one of a soil measurement of an agricultural site, a volumetric measurement associated with an agricultural storage container, and a weight measurement associated with an agricultural storage container;
    receiving the agricultural measurement from the agricultural measurement sensor in response to the control information;
    generating an information update according to the agricultural measurement;
    dynamically rescheduling the agricultural service based on the information update; and
    updating the global calendar of scheduled agricultural services according to the rescheduled agricultural service.

2. The computer-implemented method of claim 1, further comprising:
    updating a weather database with a weather condition for a time period encompassing a scheduled time for the agricultural service as the information update;
    identifying that the weather condition may impact execution of the agricultural service at the scheduled time; and
    wherein dynamically rescheduling the agricultural service is further based on the weather condition.

3. The computer-implemented method of claim 2, wherein identifying that the weather condition may impact the execution of the agricultural service at the scheduled time includes reviewing meteorological requirements or preferences associated with the agricultural service.

4. The computer-implemented method of claim 2, further comprising:
    updating the weather database with the weather condition by:
    communicating the control information to a weather sensor, including at least one of an anemometer, a thermometer, a barometer, and a rain gauge;
    receiving, from the weather sensor, the weather condition.

5. The computer-implemented method of claim 1, wherein the plurality of associated equipment records include one or more equipment specifications including at least one of:
    an indication of transportation options that an equipment supplier identified in the selected pairing is able to offer to transport the piece of equipment;
    a specification of equipment type or purpose;
    a specification of equipment performance or capacity;
    a specification of equipment manufacture date;
    a specification of equipment prior usage history;
    a specification of equipment maintenance requirements or maintenance records;
    a specification of equipment maximum or minimum booking periods;
    a specification of equipment operator blacklists or whitelists; and/or
    a specification of equipment operator requirements.

6. The computer-implemented method of claim 1, further comprising updating the one or more candidate pairings according to a change in availability of at least one of the one or more operators and the one or more pieces of equipment.

7. The computer-implemented method of claim 1, further comprising classifying, by the information manager, the one or more operators and the one or more pieces of equipment of the one or more candidate pairings as reserved from other pairings for a duration of the agricultural service prior to receiving the selected pairing.

8. The computer-implemented method of claim 1, wherein the agricultural measurement sensor includes one or more soil sensors, the method further comprising:
   communicating the control information to the one or more soil sensors configured to monitor agricultural land;
   receiving, as the agricultural measurement, soil condition information measured by the one or more soil sensors.

9. The computer-implemented method of claim 1, further comprising:
   communicating control information to a location transceiver associated with each of the one or more pieces of equipment to instruct taking of location measurements;
   receiving the location measurements from the location transceiver associated with each of the one or more pieces of equipment;
   tracking, by the information manager, an equipment location for each of the one or more pieces of equipment according to the location measurements, and
   updating the plurality of associated equipment records related to the one or more pieces of equipment according to the equipment location for each of the one or more pieces of equipment.

10. The computer-implemented method of claim 1, wherein the agricultural measurement sensor includes a volumetric sensor or weight sensor associated with an agricultural storage container, further comprising:
   communicating the control information to the volumetric sensor or weight sensor associated with the agricultural storage container;
   measuring, by the volumetric sensor or weight sensor responsive to the control information, a storage status of the agricultural storage container, the storage status including at least one of an amount of material, weight of material, volume of material, capacity used, or capacity remaining in the agricultural storage container;
   receiving as the agricultural measurement the storage status measured and reported by the volumetric sensor or weight sensor.

11. The computer-implemented method of claim 1, further comprising:
   receiving, by the information manager, the one or more agricultural service requirements from a device of the producer;
   updating the producer record based on the one or more agricultural service requirements;
   receiving, by the information manager, the one or more equipment supplier records from one or more devices of the one or more equipment suppliers;
   updating the plurality of associated equipment records according to the received one or more equipment supplier records;
   receiving, by the information manager, one or more operator records related to the one or more operators from one or more devices of the one or more operators;
   updating the one or more operator information fields according to the received one or more operator records;
   receiving, by the information manager, a selected pairing of the one or more candidate pairings from the device of the producer; and
   sending, by the information manager to a device of an operator and to a device of an equipment supplier identified in the selected pairing, the equipment record of the piece of equipment identified in the selected pairing, and one or more of the agricultural service requirements related to the agricultural service.

12. The computer-implemented method of claim 1, further comprising:
   updating information related to reliability of the piece of equipment and reputational rating of the operator according to feedback associated with previously performed agricultural services involving one or more of the piece of equipment or the operator.

13. The computer-implemented method of claim 1, further comprising:
   updating, by the information manager, the producer record based on auxiliary information obtained from an auxiliary storage by periodically and automatically accessing public records.

14. The computer-implemented method of claim 1, further comprising:
   determining probabilities of service requirements and weather conditions according to geographical information, meteorological information and service times; and
   determining the plurality of pairing scores according to the probabilities of service requirements.

15. The method of claim 1, further comprising:
   obtaining one or more producer preferences associated with reliability of a piece of equipment and a reputational rating of an operator of equipment;
   computing a plurality of field compatibility scores, each field compatibility score being representative of a degree of compatibility between two or more of a producer information field, an operator information field, and an equipment record information field;
   weighting, based on predetermined weights and the one or more producer preferences, the plurality of field compatibility scores to generate a weighted plurality of field compatibility scores;
   wherein:
   the plurality of pairing scores are determined according to a sum of the weighted plurality of field compatibility scores, the one or more candidate pairings are selected according to highest pairing scores of the plurality of pairing scores; and the one or more candidate pairings include the equipment record of the piece of equipment and the operator record of the operator of each candidate pairing.

16. The computer-implemented method of claim 15, wherein computing the plurality of field compatibility scores is performed by an artificial intelligence process within the information manager.

17. The method of claim 1, wherein the at least one processor is in communication with a system communications module,
   wherein the agricultural measurement sensor includes a measurement storage, a sensor communications module, a communications antenna, and
   wherein the system communications module is configured for bidirectional wireless communication with the sensor communications module of the agricultural measurement sensor.

18. A computer-implemented method for scheduling equipment and an operator necessary to provide an agricultural service to a producer, the method to be carried out by at least one processor executing computer instructions, the method comprising:
   obtaining, by an information manager, a producer record including a plurality of producer information fields about the producer, one or more equipment supplier records including a plurality of associated equipment records including equipment record information fields for one or more pieces of equipment controlled by one or more equipment suppliers, and one or more operator records including a plurality of operator information fields about one or more operators; receiving, by the information manager, one or more agricultural service requirements related to the agricultural service;

communicating location control information to a location transceiver associated with each of the one or more pieces of equipment to instruct the taking of location measurements;

receiving the location measurements from the location transceiver associated with each of the one or more pieces of equipment;

tracking, by the information manager, equipment locations of the one or more pieces of equipment according to the location measurements; updating the plurality of associated equipment records according to the equipment locations;

obtaining one or more producer preferences associated with reliability of a piece of equipment and a reputational rating of an operator of equipment;

determining a plurality of pairing scores between the one or more agricultural service requirements, the plurality of associated equipment records, and the one or more operator records based on compatibility scores;

producing, by the information manager for the agricultural service and according to the plurality of pairing scores, one or more candidate pairings comprising an operator of the one or more operators and a piece of equipment of the one or more pieces of equipment;

sending, by the information manager, the one or more candidate pairings to a device of the producer;

scheduling the agricultural service according to a selection by the producer from the one or more candidate pairings; updating a global calendar of scheduled services between a plurality of producers, a plurality of operators, and a plurality of pieces of equipment with the agricultural service;

communicating control information to an agricultural measurement sensor via a wireless cellular network to control the agricultural measurement sensor to take an agricultural measurement, the agricultural measurement including at least one of a soil measurement of an agricultural site, a volumetric measurement associated with an agricultural storage container, and a weight measurement associated with an agricultural storage container;

receiving the agricultural measurement from the agricultural measurement sensor in response to the control information;

generating an information update according to the agricultural measurement; dynamically rescheduling the agricultural service based on the information update; and updating the global calendar of scheduled services.

19. A system for automatic rescheduling of agricultural service operations, the system comprising:

an agricultural measurement sensor, including at least one of a soil sensor associated with an agricultural site, a volumetric sensor or weight sensor associated with an agricultural storage container, and a weather sensor;

a server including at least one processor configured to:

communicate control information to the agricultural measurement sensor to control the agricultural measurement sensor to take an agricultural measurement, the agricultural measurement including at least one of a soil measurement of an agricultural site, a volumetric measurement associated with an agricultural storage container, and a weight measurement associated with an agricultural storage container;

receive the agricultural measurement from the agricultural measurement sensor in response to the control information;

schedule an agricultural service between a producer, a first equipment supplier, and a first operator according to the agricultural measurement and at least equipment availability, operator availability, equipment compatibility, and operator compatibility;

prior to the scheduled agricultural service taking place, communicate second control information to a second agricultural measurement sensor to control the second agricultural measurement sensor to take a second agricultural measurement, the second agricultural measurement comprising a weather measurement;

receive the second agricultural measurement from the second agricultural measurement sensor in response to the second control information;

responsive to receiving the second agricultural measurement from the second agricultural measurement sensor, reschedule the agricultural service between the producer, the first equipment supplier or a second equipment supplier, and the first operator or a second operator according to the second agricultural measurement and at least equipment availability, operator availability, equipment compatibility, and operator compatibility; and responsive to rescheduling the agricultural service, updating a calendar for the producer, the first equipment supplier, and the first operator.

20. The system of claim 19, further comprising, responsive to rescheduling the agricultural service, updating a global calendar of scheduled services between a plurality of producers, a plurality of operators, and a plurality of pieces of equipment with the agricultural service.

\* \* \* \* \*